US007890402B2

(12) United States Patent
Golembiewski

(10) Patent No.: US 7,890,402 B2
(45) Date of Patent: Feb. 15, 2011

(54) METHOD AND SYSTEM FOR A DEFERRED VARIABLE ANNUITY WITH LIFETIME BENEFIT PAYMENTS AS A FUNCTION OF AN INFLATION ADJUSTMENT FACTOR

(75) Inventor: Keith E. Golembiewski, Suffield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 459 days.

(21) Appl. No.: 11/986,533

(22) Filed: Nov. 21, 2007

(65) Prior Publication Data

US 2009/0030738 A1 Jan. 29, 2009

Related U.S. Application Data

(60) Provisional application No. 60/961,787, filed on Jul. 24, 2007.

(51) Int. Cl.
*G06Q 40/00* (2006.01)
(52) U.S. Cl. ............................................. 705/35; 705/4
(58) Field of Classification Search .................. 705/35, 705/4
See application file for complete search history.

(56) References Cited

U.S. PATENT DOCUMENTS

| 5,754,980 | A | 5/1998 | Anderson |
| 5,878,405 | A | 3/1999 | Grant |
| 5,893,071 | A | 4/1999 | Cooperstein |
| 5,913,198 | A | 6/1999 | Banks |
| 5,926,800 | A | 7/1999 | Baronowski |
| 5,933,815 | A | 8/1999 | Golden |
| 6,064,986 | A | 5/2000 | Edelman |
| 6,611,808 | B1 | 8/2003 | Preti |
| 6,611,815 | B1 * | 8/2003 | Lewis et al. ................ 705/36 R |
| 6,661,815 | B1 | 12/2003 | Kozlovsky |
| 6,950,805 | B2 | 9/2005 | Kavanaugh |
| 6,963,852 | B2 | 11/2005 | Koresko |
| 7,016,871 | B1 | 3/2006 | Fisher |
| 7,089,201 | B1 | 8/2006 | Dellinger |
| 7,113,913 | B1 | 9/2006 | Davis |
| 7,376,608 | B1 * | 5/2008 | Dellinger et al. .......... 705/36 R |
| 2001/0014873 | A1 | 8/2001 | Henderson |

(Continued)

OTHER PUBLICATIONS

"Income Select for Life" (Transamerica Capital Financial Life Insurance Company), https://www.transamericaadvisor.cony/contentServer/MediaServer? uri=/site/tciidex/media/PDF/Annuities_TCI/Client _Approved_Material/Tips_and_Techniques/.BRIS.pdf.

(Continued)

*Primary Examiner*—Kirsten S Apple
*Assistant Examiner*—Scott S Trotter
(74) *Attorney, Agent, or Firm*—Howard IP Law Group, PC

(57) ABSTRACT

A computer implemented data processing system and method administers a deferred variable annuity contract during the accumulation phase for a relevant life. The annuity contract has a payment base value, a contract value, and a lifetime benefit payment amount available for withdrawal without reduction in the payment base. The lifetime benefit payment amount is based in part on a withdrawal percent and in part on an adjustment factor based on a number of years deferred before taking a first lifetime benefit payment.

23 Claims, 9 Drawing Sheets

U.S. PATENT DOCUMENTS

| | | |
|---|---|---|
| 2001/0047325 A1 | 11/2001 | Livingston |
| 2002/0035527 A1 | 3/2002 | Corrin |
| 2002/0174045 A1 | 11/2002 | Arena |
| 2002/0194098 A1 | 12/2002 | Stiff et al. |
| 2003/0088430 A1 | 5/2003 | Ruark |
| 2003/0105652 A1 | 6/2003 | Arena |
| 2003/0120570 A1 | 6/2003 | Dellinger |
| 2003/0171956 A1 | 9/2003 | Cox |
| 2003/0187764 A1 | 10/2003 | Abba |
| 2004/0639608 | 2/2004 | Anderson |
| 2004/0088236 A1 | 5/2004 | Manning |
| 2004/0204951 A1 | 10/2004 | Wood |
| 2004/0267647 A1 | 12/2004 | Brisbois |
| 2005/0010453 A1 | 1/2005 | Terlizzi |
| 2005/0060251 A1 | 3/2005 | Schwartz |
| 2005/0177473 A1 | 8/2005 | Angle |
| 2005/0234821 A1 | 10/2005 | Benham et al. |
| 2006/0080148 A1 | 4/2006 | Koresko |
| 2006/0085338 A1 | 4/2006 | Stiff et al. |
| 2006/0089892 A1 | 4/2006 | Sullivan |
| 2006/0095353 A1 | 5/2006 | Midlan |
| 2006/0111997 A1* | 5/2006 | Abbott et al. ............... 705/35 |
| 2006/0111998 A1* | 5/2006 | Fisher et al. ............... 705/35 |
| 2006/0143055 A1 | 6/2006 | Loy |
| 2006/0149651 A1 | 7/2006 | Robinson |
| 2006/0155622 A1 | 7/2006 | Laux |
| 2006/0195375 A1 | 8/2006 | Bohn |
| 2006/0206398 A1 | 9/2006 | Coughlin |
| 2006/0206401 A1 | 9/2006 | Abbs |
| 2006/0212379 A1 | 9/2006 | Perg |
| 2006/0212380 A1 | 9/2006 | Williams |
| 2007/0011063 A1 | 1/2007 | Shelon |
| 2007/0011069 A1 | 1/2007 | Bevacqua |
| 2007/0011086 A1 | 1/2007 | Dellinger |
| 2007/0078690 A1 | 4/2007 | Kohl |
| 2007/0100715 A1* | 5/2007 | O'Donnell et al. ............ 705/35 |
| 2007/0100720 A1 | 5/2007 | Bonvouloir |
| 2007/0100726 A1 | 5/2007 | O'Flinn |
| 2007/0100727 A1 | 5/2007 | Multer |
| 2007/0106589 A1 | 5/2007 | Schirripa |
| 2007/0162380 A1 | 7/2007 | Conroy |
| 2007/0198377 A1 | 8/2007 | Livingston |
| 2008/0071661 A1 | 3/2008 | Jeudy et al. |
| 2008/0270194 A1 | 10/2008 | West et al. |

OTHER PUBLICATIONS

"Jackson Enhances Living Benefit Options within its Perspective Family of Variable Annuities" (Business Wire Apr. 30, 2007), http://findarticles.com/p/articles/mi_m0EIN/is_2007_April_30/ai_n19041944.

"Glossary of Insurance Terms" (Life Office Management Association, Inc. 2002), http://www.iii.org/media/glossary/.

"Lifetime Legacy" http://www.americo.com/lifetime/lifetimelegacy.html.

"Accelerated Death Benefits" (Jan. 22, 2007) http://www.medicare.gov/LongTermCare/Static/AccDeathBenefits.asp?dest=NAV%7CPaying%7CPrivateInsurance%7CAccDeathBenefits.

"Alternatives to Long Term Care Insurance" (SWP Advocates 2004), http://www.senior-wealth-protection-advocates.com/long-term-care-insurance-alternatives.html.

Form 485BPOS, (Apr. 26, 2006), Transamerica-NewLTC-LifetimeGMWB_May2006SECFiling.pdf.

Form N-4, (Feb. 22, 2006), Transamerica-NewLTC-LifetimeGMWB_SECFiling.pdf.

"Fidelity.com Glossary" https://scs.fidelity.com/webxpress/help/topics/help_definition_p.shtml.

"Dynamic Retirement Withdrawal Planning" R.Gene Stout and John B. Mitchell, (Financial Services Review 2006), http://www.rmi.gsu.edu/FSR/abstracts/Vol_15/zux00206000117.pdf.

"Retireonyourterms" http://www.retireonyourterms.com/ glossary/GlossaryText.htm.

"Prudential Investments Introduces Strategic Partners Annuity One: New Variable Annuity Offers Investors World-Class Money Managers and Flexible Product Features" (Business Wire Oct. 9, 2000). http://findarticles.com/p/articles/mi_m0EIN/is_2000_Oct_9/ai_65846822.

"The Power and Protection of Income Annuities" (Empire Fidelity Investments Life Insurance Company), http://personal.fidelity.com/products/annuities/pdf/IncomeAnnuitySpecialReport.pdf.

"Making IRAs Last a Lifetime with Annuities" (Life Health Advisor, Mar. 2006), http://www.fpamd.org/documents/MakingIRAsLastaLifetimewithAnnuities.pdf.

Prospectus, Penn Mutual Variable Annuity Account III, (Penn Mutual May 1, 2007), PennMutual-LifetimeGMWB-CPI_SECFiling.pdf.

Form 497, (Oct. 2, 2006), Penn-EnhancedCreditVA_May2001_Prospectus.pdf.

"RiverSource Innovations Select Variable Annuity" (River Source Life Insurance Company 2007), http://www.riversource.com/rvsc/global/docs/INNOV-SELECT-NY-AAG.pdf.

"Key to Making Retirement Savings Last: The Withdrawal Rate" (New York Life Insurance Company 2007), http://www.newyorklife.com/msm/cda/main/display/popup/print_this/1.3256.14198.00.html?&site_id=1&docLocation=http://www.newyorklife.com/cda/0,3254,14198.00.html.

"Pacific One Select Investor Guide", (Nov. 2007), http://www.mutualfunds.pacificlife.com/public/mutual_funds/product_info/individual_k/pdfs/d5026.pdf.

"Just the Facts" (Nationwide Financial Services, Inc. 2006-2007) https://ssc.nwservicecenter.com/media/pdf/product/VAM-0504AO-Fl.pdf.

Panko, Ron. New Products. Best's Review, 108(3), 24. (Jul. 2007).

Antolin, Pablo. Longevity Risk and Private Pensions. Financial Market Trends,(92), 107,109-128. (Jun. 2007).

Yates, Karen E & Liss, Stephen. Charitable Lead Annuity Trusts-A Primer. Taxation of Exempts, 19(1), 23. (Jul. 2007).

Harshman, Scott & Schaller Gordon. Private Annuities: An Income Tax Deferral Technique. Orange County Business Journal, 29(39), A56-A57. (Sep. 2006).

The Right Rider: Boomers want guaranteed lifetime income, but don't want to buy an immediate annuity. Variable annuity issuers think they have a solution. Donald Jay Korn. Financial Planning. New York: Feb. 1, 2006. p. 104-106.

"Retireonyourterms", http://www.retireonyourterms.com/ glossary/GlossaryText.htm, not later than Jul. 23, 2007.

"The Power and Protection of Income Annuities", (Empire Fidelity Investments Life Insurance Company), http //personal.fidelity.com/products/annuities/pdf/IncomeAnnuitySpecialReport.pdf, Mar. 2006.

"Income Select for Life", https://www.tran.samericaadvisor.cony/contentServer/MediaServer? uri=/site/tciidex/media/PDF/Annuities_TCI/Client_Approved_Material/Tips_and_Techniques/.BRIS.pdf; May 2007.

"Lifetime Legacy", http://www.ameirco.com/lifetime/lifetimelegacy.html, not later than Jul. 23, 2007.

"Fidelity.com Glossary", https://scs.fidelity.com/webxpress/help/topics/help_definition_p.shtml, not later than Jul. 23, 2007.

* cited by examiner

METHOD AND SYSTEM FOR A DEFERRED VARIABLE ANNUITY WITH LIFETIME BENEFIT PAYMENTS AS A FUNCTION OF AN INFLATION ADJUSTMENT FACTOR

CROSS-REFERENCE TO RELATED APPLICATIONS

This application claims the benefit of Application No. 60/961,787, filed Jul. 24, 2007.

BACKGROUND OF THE INVENTION

1. Field of the Invention

The present invention relates to a method and system for providing a deferred variable annuity with lifetime benefit payments; and more particularly, to a data processing method for administering a deferred variable annuity contract for a relevant life, the annuity contract having a payment base, a contract value, and lifetime benefit payments, wherein the lifetime benefit payment available for each period is equal to: (a withdrawal percent)×(a withdrawal base)×(an adjustment factor), wherein the Withdrawal Percent is predetermined according to a withdrawal percent table and the inflation adjustment factor is modified over time.

2. Description of the Prior Art

An immediate annuity is typically used to provide an income stream within a predetermined length of time from the date the premium is received. The amount of income can be either fixed or variable in nature and typically these products do not provide an account value. A deferred annuity is typically used to provide accumulation and, potentially, a future stream of annuity income. The deferred annuity comprises an accumulation period during which the account value will vary with the underlying investments and an annuitization period where the client purchases an immediate annuity with the account value available. Deferred and immediate annuities typically provide guaranteed income for life which transfers some portion or all of the risk of outliving one's accumulated assets to the insurer.

One basis for distinguishing commonly available deferred annuities is whether the annuity is classified as a "fixed annuity" or a "variable annuity".

In a fixed annuity, the insurer guarantees a fixed rate of interest applicable to each annuity deposit. Therefore, a fixed annuity is desirable for those seeking a "safe" investment. The guaranteed interest rate may apply for a specified period of time, often one year or more. Often, a rate guaranteed for more than one year is called a "multi-year guarantee". The rate credited on a fixed annuity is reset periodically, moving in an amount and a direction that correlate the yields available on fixed-income investments available to the insurer.

With a variable annuity, the annuity contract owner bears the investment risk. The relevant life typically has a choice of funds in which he/she can direct where the annuity deposits will be invested. The various funds or sub-accounts may include stocks, bonds, money market instruments, mutual funds, and the like.

Variable annuity contracts typically provide a death benefit. Oftentimes, during the accumulation period this death benefit is related to the contract value. That is, if the sub-accounts backing the contract value have performed poorly, then the death benefit may be reduced to an insignificant amount. After annuitization, the death benefit can be a function of the remaining payments of the annuity at the time of the relevant life's death. Further, if the annuity contract does not provide a guarantee (discussed below), the contract will terminate when the contract value goes to zero or some other amount specified in the contract or rider.

Annuity contracts may also provide guarantees in several different variations. A Guaranteed Minimum Death Benefit (GMDB) is a guarantee that provides a minimum benefit at the death of the relevant life regardless of the performance of the underlying investments. A Guaranteed Minimum Income Benefit (GMIB) is a guarantee that will provide a specified income amount at the time the contract is annuitized. The income payment will be dependent on previously stated details set out in the contract. A Guaranteed Minimum Accumulation Benefit (GMAB) is a benefit that guarantees a specified contract value at a certain date in the future, even if actual investment performance of the contract is less than the guaranteed amount. A Guaranteed Minimum Withdrawal Benefit (GMWB) is a guarantee of income for a specified period of time, and in some versions, the income stream is guaranteed for life without requiring annuitization as in the guaranteed minimum income benefit. However, this guarantee will automatically annuitize the contract if the contract value is reduced to zero or some other amount specified in the contract or rider.

Most deferred variable annuity products in the prior art typically determine the amount of the yearly lifetime benefit payments, if any, to be a predetermined percentage (withdrawal percent) of a withdrawal base. The withdrawal percent is typically determined by a predetermined withdrawal percent table that provides a particular withdrawal percent for each year of the relevant life's life according to each birthday of the relevant life. However, the effects of inflation are typically not considered when determining the respective withdrawal percents for the predetermined withdrawal percent table, and further when applying the respective withdrawal percent to determine the respective lifetime benefit payments.

Many financial products and systems have been disclosed. These include financial products with the following features: providing insurance protection against loss of retirement benefits, including providing for substitute continuing periodic payments into an investment account; administering a guaranteed benefit account that offers both a defined benefit and a defined contribution plan; providing key investment and planning tools for use by individuals in planning their retirement using a computer, software program and the Internet; method and system using logic for data collection, modeling and report generation in a retirement planning system; issuing and managing a form of security having an accumulation phase and a payout phase; providing for survivor income-replacement benefits with a guaranteed rate of interest; a financial instrument providing for the account holder to maintain liquidity in an account while at the same time receiving a guarantee of lifetime income and a guaranteed growth rate; and providing for a computer-implemented method of funding. Each one of these prior art references suffers from at least the following disadvantage(s): the annuities do not provide lifetime benefit payments that are based on an adjustment factor, wherein the adjustment factor is modified over time and helps to compensate for inflation.

Accordingly, there remains a need in the art for a data processing method for administering a deferred annuity contract for a relevant life wherein the annuity contract has lifetime benefit payments, and the lifetime benefit payment for each period is determined by the following formula:

$$LBP\ \text{withdrawal} = (\text{a Withdrawal Percent}) \times (\text{a Withdrawal Base}) \times (\text{an Adjustment Factor}),$$

wherein the withdrawal percent is predetermined according to a withdrawal percent table and wherein the inflation adjustment factor is modified over time.

SUMMARY OF THE INVENTION

The present invention provides a data processing method for administering a deferred variable annuity contract during the accumulation phase for a relevant life wherein the annuity contract has lifetime benefit payments, and wherein the lifetime benefit payment for each period is determined by the following formula:

$$LBP\ \text{withdrawal} = (a\ \text{Withdrawal Percent}) \times (a\ \text{Withdrawal Base}),$$

wherein the withdrawal percent is predetermined according to a withdrawal percent table and wherein the inflation adjustment factor is modified over time. Preferably, the adjustment factor is related to the number of deferred years waited by the relevant life until a first lifetime benefit payment withdrawal is requested. In prior art annuity products, the withdrawal percent is typically determined by a predetermined withdrawal percent table that provides a particular withdrawal percent for each year of the relevant life's life according to each birthday of the relevant life. However, typical prior art variable annuity products do not offer any inflation protection for the lifetime benefit payments. The present data processing method administers an annuity product having a payment base, a contract value, together with a guarantee of lifetime benefit payments.

Generally stated, the method of the invention calculates a payment base for the annuity contract that is preferably a function of the previous premium payments and withdrawals by the relevant life, and could include investment performance on an annual or other basis (daily, monthly, etc.). The method of the invention calculates a contract value for the annuity contract. The method determines a withdrawal percent table for the annuity contract that provides a particular withdrawal percent for each respective attained age of the relevant life. In one embodiment, during the accumulation phase the system performs the following steps: (i) if requested by the relevant life, periodically accepting premium payments from the relevant life which increase the payment base and the contract value; (ii) if requested by the relevant life, or if other defined criteria are reached, periodically calculating a lifetime benefit payment withdrawal for the relevant life which decreases the contract value, wherein the guaranteed lifetime benefit payment is determined by the following formula:

$$LBP\ \text{withdrawal} = (\text{the Withdrawal Percent}) \times (a\ \text{Withdrawal Base}) \times (\text{an Inflation Adjustment Factor}),$$

wherein the withdrawal percent is predetermined according to a withdrawal percent table and wherein the adjustment factor is modified over time; and (iii) if requested by the relevant life, periodically calculating a withdrawal payment—that is in excess of the lifetime benefit payment—to the relevant life from the contract value which decreases each of: the contract value and the payment base. Upon the death of the relevant life, the present method pays a death benefit to a beneficiary, wherein the death benefit is the greater of: (a) the guaranteed death benefit amount; and (b) the present contract value.

Preferably, the annuity contract of the data processing method is a deferred variable annuity and further includes sub-accounts whose market performance can cause the contract value to increase or decrease. In other aspects of the invention, the annuity contract may be selected from the group of fixed, combination variable/fixed, and equity indexed annuities.

In addition, the account may be subject to M, E & A, 12 b-1 and fund level charges. These charges may or may not be assessed against the contract value.

The guaranteed death benefit is paid to the beneficiary only if the relevant life dies during the accumulation phase. However, a guaranteed death benefit may also be payable during annuitization as well. The lifetime benefit payment may be paid once yearly or periodically throughout the year; however, there is a maximum lifetime benefit payment for any given year. In one embodiment, the present method allows the relevant life to have the opportunity to request a lifetime benefit payment during each period that is up to the greater of (i) (the Payment Base)×(the Withdrawal Percent)×(the adjustment factor);; and (ii) (the Contract Value)×(the Withdrawal Percent)×(the adjustment factor);. Therefore, in this embodiment, the lifetime benefit payment is not based on a percentage of a fixed withdrawal base amount, and the withdrawal base amount may increase depending on the performance of the underlying investments of the annuity product and if the contract value is greater than the payment base during a given period. However, if the contract value is less than the payment base, then the available lifetime benefit payment is a percentage (Withdrawal Percent) of the payment base times the adjustment factor.

The relevant life is eligible to take advantage of the withdrawal percent provided by the predetermined withdrawal percent table, which is based on the attained age years, which have completed in the relevant life's lifetime. Accordingly, the relevant life has the opportunity to request a lifetime benefit payment that has the potential to afford a greater monetary value at an earlier point in time and at an earlier age than prior art annuity products. Further, the relevant life is protected against inflation by deferring the first lifetime benefit payment for several years.

In one aspect, the value of the annuity payments, if necessary, equals the value of the most recent lifetime benefit payment. In other aspects, excess withdrawals, required minimum distributions or step-ups could cause the value of the annuity payments or guaranteed lifetime benefit payments to change.

In another aspect of the invention, there is provided a data processing method for administering a deferred variable annuity contract for a relevant life, the annuity contract having a payment base, a contract value and a guarantee of lifetime benefit payments, comprising the steps of: (i) calculating a payment base; (ii) calculating a contract value; (iii) determining a withdrawal percent table; and (iv) calculating a lifetime benefit payment, wherein the lifetime benefit payment is determined by the following formula:

$$LBP\ \text{withdrawal} = (\text{the Withdrawal Percent}) \times (a\ \text{Withdrawal Base}) \times (\text{an Inflation Adjustment Factor}),$$

wherein the withdrawal percent is determined by said withdrawal percent table and wherein the adjustment factor is modified over time. Preferably, the adjustment factor is related to the number of deferred years waited by the relevant life until a first lifetime benefit payment withdrawal is requested.

The invention can comprise a deferred variable annuity contract having: (i) means for calculating a payment base; (ii) means for calculating a contract value; (iii) means for determining a withdrawal percent table; and (iv) means for calculating a lifetime benefit payment; wherein the lifetime benefit payment is determined by the following formula:

$LBP$ withdrawal=(a Withdrawal Percent)×(a Withdrawal Base)×(an Inflation Adjustment Factor), wherein the withdrawal percent is predetermined according to a withdrawal percent table and wherein the adjustment factor is modified over time. Preferably, the adjustment factor is related to the number of deferred years waited by the relevant life until a first lifetime benefit payment withdrawal is requested.

In a preferred embodiment, the adjustment factor is determined by the following formula:

Inflation Adjustment Factor=$[1+$(a Predetermined Factor)×(the number of deferred years waited by the relevant life until a first lifetime benefit payment withdrawal is requested)$]^Y$, wherein $Y$ is equal to (the number of the lifetime benefit payment withdrawal year, wherein the year of the first lifetime benefit payment withdrawal is set as year number 1).

The preferred predetermined factor is in the range of 0%-5.0%. More preferably, the predetermined factor is in the range of 0.05%-2.0%. Most preferably, the predetermined factor is equal to 0.25%.

In a preferred embodiment, (the Withdrawal Percent)×(the adjustment factor) must be equal to or less then a predetermined maximum percent. Preferably, the predetermined maximum percent is in the range of 0% to 25.0%. More preferably, the predetermined maximum percent is in the range of 1.0% to 15.0%. Most preferably, the predetermined maximum percent is equal to 10.0%.

In another embodiment, the present invention comprises a system for administering a deferred variable annuity contract during the accumulation phase for a relevant life, the annuity contract having a payment base value, a contract value, and lifetime benefit payments, comprising: a storage device; a processor coupled to the storage device, the storage device storing instructions that are utilized by the processor, the instructions comprising: (i) receiving information from said relevant life in order to establish the deferred variable annuity contract; (ii) receiving lifetime benefit payment withdrawal requests from the relevant life; (iii) calculating a lifetime benefit payment; wherein the lifetime benefit payment withdrawal is determined according to the following formula:

$LBP$ withdrawal (a Withdrawal Percent)×(a Withdrawal Base)×(an Adjustment factor), wherein the withdrawal percent is predetermined according to said withdrawal percent table, and wherein the inflation adjustment factor is modified over time.

The present invention solves several of the problems associated with conventional administration of variable annuity contracts. Determination of the lifetime benefit payment is accomplished via an improved formula that provides the potential to protect against inflation. The relevant life is afforded increased security by the availability of a potentially enhanced lifetime benefit payment at an earlier age and which exponentially increases over time to keep up with inflation. Significantly, an adjustment factor is used to determine the withdrawal payment and the adjustment factor is modified over time, and is preferably related to the number of deferred years waited by the relevant life until a first lifetime benefit payment withdrawal is requested.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DESCRIPTION OF THE PREFERRED EMBODIMENTS

Figure 1:
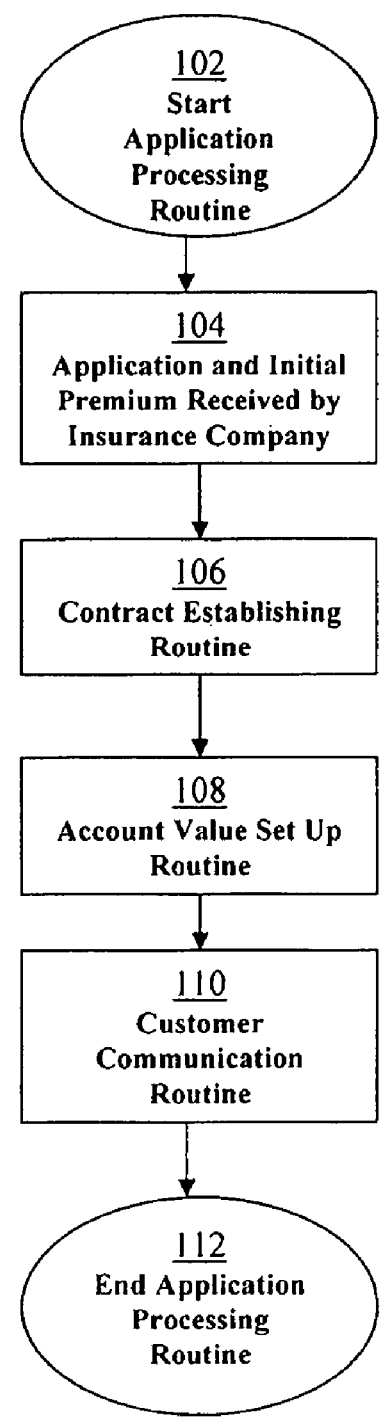
FIG. 1 is a flow chart illustrating the manner in which a new annuity contract application is processed.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. They are deemed to afford the best embodiment for purposes of disclosure; but should not be construed as limiting the scope of the invention. The following presents a detailed description of the preferred embodiment of the present invention.

The present invention comprises a data processing method for administering a deferred variable annuity contract having a payment base, a contract value, and lifetime benefit payments. As used herein, the term "annuity contract" means a set of rules and other data that are reflected in a computer processing system for operations of the annuity product. In the present invention, the lifetime benefit available for each period is determined by the following formula:

$$LBP \text{ withdrawal} = (\text{a Withdrawal Percent}) \times (\text{a Withdrawal Base}) \times (\text{an inflation adjustment factor}),$$

wherein the withdrawal percent is predetermined according to a withdrawal percent table and wherein the adjustment factor is modified over time. Preferably, the adjustment factor is related to the number of deferred years waited by the relevant life until a first lifetime benefit payment withdrawal is requested. The present data processing method is preferably in the form of a rider to a variable annuity contract. In another aspect of the invention, the present data processing method is not in the form of a rider, but is a part of the base contract. In exchange for paying higher fees, the relevant life receives several advantages by selecting the method and system of the present invention which provides an inflation adjusted lifetime benefit payment available for each period that is related to a withdrawal percent table and further including an adjustment factor that is modified over time, and is preferably related to the number of deferred years waited by the relevant life until a first lifetime benefit payment withdrawal is requested. These advantages include the following: The relevant life will have the opportunity to request a lifetime benefit payment during each period that is based on a withdrawal percent that is provided by a predetermined withdrawal percent table and wherein the lifetime benefit payment is adjusted according to an inflation adjustment factor. The relevant life is eligible to take advantage of the adjustment factor regardless of his actual age. The adjustment factor is modified over time, and is preferably related to the number of deferred years waited by the relevant life until a first lifetime benefit payment withdrawal is requested. That is, the greater the number of deferred years, then the greater the impact of the adjustment factor. Accordingly, depending on the number of deferred years waited by the relevant life until a first lifetime benefit payment withdrawal is requested, the relevant life has the opportunity to request a lifetime benefit payment that has the potential to afford a greater monetary value at an earlier point in time in order to help compensate for inflation, unlike the prior art annuity products. This advantage is especially beneficial to a person who purchases the annuity contract at a relatively early age and waits many years prior to requesting a first withdrawal payment. Significantly, by deferring the first withdrawal payment for a number of years, the relevant life takes advantage of a potentially higher withdrawal percent value to help compensate for inflation, as compared to prior art annuity products which provide withdrawal payments that do not include any provisions to protect against inflation. Therefore, the present invention has the ability to pay a living benefit that will include annual inflation adjustments if the payments begin in the future using future dollars rather than today's dollars. Further, the present invention may provide an annually increasing guaranteed living benefit payment to address potential inflation concerns. Accordingly, the present invention provides greater income potential in the future.

The present invention comprises a data processing method for administering a deferred variable annuity contract for a relevant life, the annuity contract having a payment base, a contract value and lifetime benefit payments, comprising the steps of: (i) calculating a payment base; (ii) calculating a contract value; (iii) determining a withdrawal percent table; and (iv) calculating a lifetime benefit payment wherein the lifetime benefit payment is determined by the following formula:

$$LBP \text{ withdrawal} = (\text{the Withdrawal Percent}) \times (\text{a Withdrawal Base}) \times (\text{an Inflation Adjustment Factor}),$$

wherein the withdrawal percent is determined by said withdrawal percent table and wherein the inflation adjustment factor is modified over time. Preferably, the adjustment factor is related to the number of deferred years waited by the relevant life until a first lifetime benefit payment withdrawal is requested.

In another embodiment, the present invention comprises a system for administering a deferred variable annuity contract during the accumulation phase for a relevant life, the annuity contract having a payment base value, a contract value, and lifetime benefit payments, comprising: a storage device; a processor coupled to the storage device, the storage device storing instructions that are utilized by the processor, the instructions comprising: (i) receiving information from said relevant life in order to establish the deferred variable annuity contract; (ii) receiving lifetime benefit payment withdrawal requests from the relevant life; (iii) calculating a lifetime benefit payment; wherein the lifetime benefit payment withdrawal is determined according to the following formula:

$$LBP \text{ withdrawal} = (\text{a Withdrawal Percent}) \times (\text{a Withdrawal Base}) \times (\text{an Adjustment Factor}),$$

wherein the withdrawal Percent is predetermined according to said withdrawal percent table and wherein the inflation adjustment factor is modified over time.

It should be understood that as used herein the term "periodically" includes method steps that in certain aspects may only be performed once. In other aspects, such "periodically" performed method steps may be performed more than once as described herein.

The following definitions are given hereunder to better understand terms used in the specification.

"Relevant Life" or "Covered Life": The term relevant life or covered life is the governing life for determination of the living benefits provided under this illustrative embodiment. Covered life (or relevant life) may refer to any one or more of the following: an owner, joint owner, annuitant, joint annuitant, co-owner, co-annuitant or beneficiary.

"Withdrawal Base": The withdrawal base is the amount used in one embodiment of the present invention to determine the lifetime benefit payment. Preferably, the withdrawal base may be equal to the amount of the original premium, the payment base value, the contract value, or the greater of the payment base value and the contract value.

"Payment Base": The payment base (PB) (or more accurately the payment base value) is the amount used in one embodiment of the present invention to determine the lifetime benefit payment and the rider charge. In one embodiment of the present invention, the initial payment base value equals the initial premium.

"Premium": 100% of the dollar amount of the initial or subsequent premium payments deposited into the contract before application of any sales charges or payment enhancements.

"Withdrawal Request": A request made by the relevant life to withdraw funds during the "accumulation phase" of the contract. One type of withdrawal is a lifetime benefit payment. Any withdrawal that is in excess of the lifetime benefit payment may: (i) decrease the contract value below the minimum contract value; (ii) decrease the payment base value; and (iii) decrease the guaranteed death benefit.

"Lifetime Benefit Payment": A benefit payment that is available until the death of the relevant life. The lifetime benefit payment may be paid yearly in one embodiment. The total lifetime benefit payment for the year may also be distributed monthly, quarterly or any other defined period. Preferably, the lifetime benefit payment is only available if the covered life age is 60 (or other predetermined age) or older. Preferably, if the relevant life is age 59 (or other predetermined age) or younger, the LBP is equal to zero. Other age restrictions can also be utilized for the lifetime benefit payment. Preferably, the lifetime benefit payment is determined by the following formula:

$$LBP = (\text{a Withdrawal Percent}) \times (\text{a Withdrawal Base}) \times (\text{an Adjustment Factor}),$$

wherein the withdrawal percent is predetermined according to a withdrawal percent table and wherein the adjustment factor is modified over time. Preferably, the adjustment factor is related to the number of deferred years waited by the relevant life until a first lifetime benefit payment withdrawal is requested. It should be understood that in other embodiments of the present invention, other formulas may be utilized for determining the lifetime benefit payment.

"Contract Value": The contract value (CV) is a numerical measure of the relative worth of a variable annuity product during the accumulation phase. The contract value is determined by adding the amount of purchase payments made during the accumulation phase, deducting management fees, deducting contract fees, deducting optional rider fees and surrenders made by the owner, and adjusting for the relative increase (or decrease) of the investment option(s) chosen by the owner. It should be understood that in other embodiments of the present invention, other formulas may be utilized for determining the contract value.

"Sub-account": Variable account investments within the variable annuity contract, such as mutual funds, stocks and bonds.

"Withdrawal": Also known as a "surrender", a relevant life may withdraw up to the contract value at any time.

"Death Benefit": The death benefit provision guarantees that upon the death of the relevant life a death benefit (DB) is paid to a beneficiary named in the contract that is equal to the greater of the guaranteed death benefit or the contract value as of the date the annuity company receives due proof of death. It should be understood that in other embodiments of the present invention, other formulas may be utilized for determining the guaranteed death benefit.

"Benefit Amount": In one embodiment of the present invention, the benefit amount is used to calculate that amount of the death benefit. Preferably, the benefit amount is equal to the premium payments minus any lifetime benefit payments or withdrawals.

"AMF": Annual Maintenance Fee.

"Annuity Commencement Date": The annuity commencement date (ACD) is the date upon which the contract enters the "annuitization phase".

"Withdrawal Percent": In one embodiment of the present invention, the withdrawal percent (WP) is used to determine the amount of the lifetime benefit payment. It should be understood that in other embodiments of the present invention, other formulas may be utilized for determining the lifetime benefit payment.

"PB increase": Payment Base increase.

"Adjustment Factor": A factor that is included in the formula that is used when determining the lifetime benefit payment and which helps to protect against inflation. Preferably, the adjustment factor is modified over time and is related to the number of deferred years waited by the relevant life until a first lifetime benefit payment withdrawal is requested.

"Step-Up": An increase to the payment base value that is available if the contract value increases because of favorable performance of the underlying investments. Preferably, the step-up is guaranteed at a predetermined percentage.

"Partial Surrender": Partial surrender means the gross amount of the partial surrender and will include any applicable contingent deferred sales charges.

"Covered Life Change": Any contractual change before ACD that causes a change in the covered life will result in a reset in the benefits provided under the rider and allows the issuing company to impose the fund allocation restrictions.

"Annuity Contract": The term annuity contract means a set of rules and other data that are reflected in a computer processing system for operations of the annuity product.

"Issue Rules": The issuance of a contract may be subject to established requirements known as issue rules.

The following detailed illustrative embodiment(s) is presented to provide a more complete understanding of the invention. The specific techniques, systems, and operating structures set forth to illustrate the principles and practice of the invention may be embodied in a wide variety of sizes, shapes, forms and modes, some of which may be quite different from those in the disclosed embodiment. Consequently, the specific structural and functional details disclosed herein are exemplary. They are deemed to afford the best embodiment for purposes of disclosure; but should not be construed as limiting the scope of the invention.

Covered Life in Single and Joint/Spousal Election(s)

The covered life, or relevant life, may have a single life election or joint/spousal continuation election as described more fully herein.

Single Life Election:

If a natural owner, the covered life is the owner and the joint owner (if any) on the rider effective date. If a non-natural owner, the covered life is the annuitant on the rider effective date. All age-contingent benefit provisions are based on the attained age of the oldest covered life.

Joint/Spousal Continuation Election:

If a natural owner, the covered life is both spouses (as defined by Federal Law). All age-contingent benefit provisions are based on the attained age of the youngest covered life.

Issues Rules

The following issue rules are set forth to provide a more complete understanding of this illustrative embodiment of the present invention. It should be understood by those skilled in the art that these issue rules are set forth for illustrative purposes only and that other rules may be utilized. Accordingly, the issue rules set forth below should not be construed as limiting the scope of the invention.

The issue rules may include a maximum issue age. In one embodiment, the riders are not available if any covered life or annuitant is age 81 (or other predetermined age) or greater on the rider effective date. In another embodiment, the riders are not available if any covered life or annuitant is age 76 (or other predetermined age) or greater on the Rider effective date. The rider may be elected on contract issue or post-issue.

Single Life Election: No additional requirements

Joint/Spousal Continuation Election: (This may also include co-annuitants)

One of the following must apply:
- If a natural owner purchases Joint/Spousal election, and adds a spousal joint owner, then the owner can name anyone else as the designated beneficiary, because by contract disposition, the joint owner will receive the death benefit.
- If a natural owner purchases joint/spousal election, and does not add a joint owner, then the owner must name their spouse as the designated beneficiary.
- If a non-natural owner purchases joint/spousal election, then the annuitant's spouse must be the designated beneficiary.

A joint owner who is not the owner's spouse is not allowed.

Calculation of the Withdrawal Percent (WP)

The Withdrawal Percent (WP) is used to determine the amount of the lifetime benefit payment. In a preferred embodiment, a predetermined withdrawal percent table (below) provides a particular Withdrawal Percent for each respective attained age. As shown below, the withdrawal percent table may group certain attained age ranges into the same withdrawal percent. Alternatively, each age of the relevant life may be provided with a different Withdrawal Percent. Preferably, there is a minimum and maximum withdrawal percent for any given attained age in the withdrawal percent table.

In another embodiment, the WP is determined at the later of: (i) the attained age of the covered life on the most recent contract anniversary prior to the first withdrawal, or (ii) the contract anniversary immediately following the covered life's $60^{th}$ birthday (or other predetermined age).

Withdrawal Percentage Table
(Note: the following percentages and ages, if ages are in fact used, can vary)

5.0% for attained ages 60 to 64;
5.5% for attained ages 65 to 69;
6.0% for attained ages 70 to 74;
6.5% for attained ages 75 to 79; and
7.0% for attained ages 80 and above.

Calculation of the Payment Base (PB)

The Payment Base (PB) (or more accurately payment base value) is the amount used to determine the lifetime benefit payment (LBP) and the rider charge.

A total partial surrender amount in a contract year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents. The maximum PB is $5,000,000.

If this rider is effective on the contract issue date, then the PB equals the X % of the initial premium. If this rider is effective after the contract issue date, then the PB equals 100% of the dollar amount of the contract value on the rider effective date, less any payment enhancements received in the last twelve months.

When subsequent premium payments are received, the PB will be increased by 100% of the dollar amount of the subsequent premium payment. Whenever a partial surrender is made prior to the contract anniversary immediately following the covered life's $60^{th}$ birthday (or other predetermined age), the payment base is reduced for an adjustment defined below.

The "threshold" definition is as follows: 5% single/4.5% joint/spousal multiplied by the greater of the payment base or contract value at the beginning of the contract year plus subsequent premiums prior to a partial surrender.

For cumulative partial surrenders during each contract year that are equal to or less than the threshold, the adjustment is equal to the dollar amount of the partial surrender. For any partial surrender that first causes cumulative partial surrenders during the contract year to exceed the threshold, the adjustment is the dollar amount of the partial surrender that does not exceed the threshold. For the portion of the withdrawal that exceeds the threshold, the adjustment is a factor. The factor is as follows:

$1-(A/(B-C))$ where

A=partial surrenders during the contract year in excess of the threshold;
B=contract value immediately prior to the partial surrender; and
C=the threshold, less any prior partial surrenders during the contract year. If C results in a negative number, C becomes zero.

For partial surrenders during each contract year, where the sum of prior partial surrenders are in excess of the threshold, the adjustment is a factor. The factor is applied to the payment base immediately before the surrender. The factor is as follows:

$1-(A/B)$ where

A=the amount of the partial surrender;
B=contract value immediately prior to the partial surrender.

Whenever a partial surrender is made on or after the contract anniversary immediately following the covered life's $60^{th}$ birthday (or other predetermined age), the PB will be equal to the amount determined as follows:
- If the total partial surrenders since the most recent contract anniversary are equal to or less than the current lifetime benefit payment (LBP), the PB is not reduced by the amount of the partial surrender.
- If the total partial surrenders since most recent contract anniversary are more than the current LBP, but all partial surrenders were paid under the Automatic Income Required Minimum Distribution (AIRMD), the PB is not reduced by the amount of partial surrender.

For any partial surrender that first causes cumulative partial surrenders during the contract year to exceed the current LBP and the RMD exception above does not apply, the adjustment is a factor. The factor is as follows:

$1-(A/(B-C))$ where

A=partial surrenders during the contract year in excess of the LBP;
B=contract value immediately prior to the partial surrender; and
C=the LBP, less any prior partial surrenders during the contract year. If C results in a negative number, C becomes zero.

For additional partial surrender(s) in a contract year, where the sum of all prior partial surrenders exceed the current LBP, the PB will be reduced by applying a factor.

The factor is as follows:

1−(A/B) where

A=the amount of the partial surrender;
B=contract value immediately prior to the partial surrender.

Benefit Increase Provision

In one embodiment, the withdrawal percent will be set at the attained age of the first withdrawal and will not increase thereafter. In another embodiment, the benefit increase is facilitated through an increase in the payment base.

On every contract anniversary up to and including the contract anniversary immediately following the covered life's 80$^{th}$ birthday (or other predetermined age), it will be determined if an increase in the PB is applicable. If an increase is applicable, the PB will increase by the factor below, subject to a minimum of zero and a maximum of 10% (note: the percentage could change or it could be a full step-up (no limit)):

(contract value prior to rider charge taken on current anniversary/maximum contract value)−1 where maximum contract value equals the greater of (A) or (B) below:
(A) the contract value on the rider effective date, plus premiums received after the rider effective date;
(B) the contract value on each subsequent contract anniversary, excluding the current contract anniversary plus premiums received after the contract anniversary date. (Similar to MAV except that there is no adjustment for withdrawals.)

The WP is locked in on the date of the first withdrawal.

In another embodiment, the benefit increase is facilitated through an inflation adjustment factor. Preferably, the inflation adjustment factor is determined by a formula that is related to the number of deferred years waited by the relevant life until a first lifetime benefit payment withdrawal is requested. The formula for determining the inflation adjustment factor is predetermined by the company issuing the annuity. In a preferred embodiment, the inflation adjustment factor is determined by the following formula:

Inflation Adjustment Factor=[1+(a predetermined inflation factor)×(the number of deferred years waited by the relevant life until a first lifetime benefit payment withdrawal is requested)]$^Y$, wherein $Y$ is equal to the number of the lifetime benefit payment withdrawal year, wherein the year of the first lifetime benefit payment withdrawal is set as year number 1).

Preferably, the predetermined inflation factor is in the range of 0%-5.0%. More preferably, the predetermined inflation factor is in the range of 0.05%-2.0%. Most preferably, the predetermined inflation factor is equal to 0.25%.

In a preferred embodiment, (the Withdrawal Percent)×(the Inflation Adjustment Factor) must be equal to or less then a predetermined maximum percent. Preferably, the predetermined maximum percent is in the range of 0% to 25.0%. More preferably, the predetermined maximum percent is in the range of 1.0% to 15.0%. Most preferably, the predetermined maximum percent is equal to 10.0%.

Calculation of the Lifetime Benefit Payment

The LBP is available until the death of any covered life or until the withdrawal benefit is revoked.

A total partial surrender amount in a contract year that exceeds the LBP by not more than $0.12 (the tolerance amount) will be deemed not more than the LBP. This provision recognizes that owners may take the LBP in installments over the year, and the amount of installment may round the proportional distribution amount to the higher cent. Therefore, owners intended to stay within the LBP may exceed it by only a few cents.

On the Rider effective date, the following applies to the calculation of the LBP.

If the covered life is age 60 (or other predetermined age) or older on the rider effective date, the LBP is equal to the payment base multiplied by the WP as provided by the predetermined withdrawal percent table and further multiplied by an inflation adjustment factor (described hereinabove).

If the covered life is Age 59 (or other predetermined age) or younger on the rider effective date, the LBP is equal to zero.

On any contract anniversary immediately following the covered life's 60$^{th}$ birthday (or other predetermined age), the following describes in more detail the calculation of the LBP.

The LBP is equal to the WP multiplied by the withdrawal base and further multiplied by an inflation adjustment factor. The withdrawal base may be equal to the original premium, the payment base, the contract value or the greater of payment base or the contract value on the anniversary for both time-based, Age-Based and the Market-Based Riders, single and spousal. The LBP can fluctuate year to year due to market performance, but will never be lower than the WP multiplied by the PB and further multiplied by an inflation adjustment factor as long as the covered life has reached the age of 60 (or other predetermined age). In addition, if the account value on the anniversary exceeds the PB, the LBP may decrease in future years but will never be less than the PB multiplied by the WP and further multiplied by an inflation adjustment factor.

When a subsequent premium payment is made after the contract anniversary immediately following the covered life's 60$^{th}$ birthday (or other predetermined age), the LBP is equal to the greater of: (i) the WP, on the most recent contract anniversary, multiplied by the greater of the PB or the contract value immediately after the subsequent premium is received and further multiplied by an inflation adjustment factor, or (ii) the prior LBP.

Whenever a partial surrender is made on or after the contract anniversary immediately following the covered life's 60$^{th}$ birthday (or other predetermined age):

If the PB is zero due to withdrawals, the LBP is equal to zero. During the deferral stage, subsequent premiums may be made to re-establish the PB and the LBP.

The LBP will be equal to the amount determined in either one as follows:

If the total partial surrenders since the most recent contract anniversary are equal to or less than the current lifetime benefit payment (LBP), the LBP is equal to the LBP immediately prior to the partial surrender.

If the total partial surrenders since the most recent contract anniversary are more than the current LBP, but all partial surrenders were paid under the Automatic Income Required Minimum Distribution (AI RMD), the provisions of above will apply.

If the total partial surrenders since the most recent contract anniversary are more than the current LBP and the AI RMD exception above does not apply, the LBP is reset to the WP on the most recent contract anniversary multiplied by the greater of the PB or contract value immediately after the partial surrender and further multiplied by an inflation adjustment factor.

The contract owner may request an amount less than, equal to, or greater than the lifetime benefit payment. Total partial surrenders taken during a contract year on or after the contract anniversary immediately following the covered life's $60^{th}$ birthday (or other predetermined age) which exceed the LBP may reduce future LBP values and may reduce the PB. If the total amount requested by the contract owner during a contract year is less than the lifetime benefit payment, the excess cannot be carried over to increase the future years' lifetime benefit payments.

Contingent Deferred Sales Charge (CDSC)—Free Up to the Amount of the LBP

If the LBP exceeds the actual withdrawal amount (AWA) on the most recent contract anniversary, any contingent deferred sales charge (CDSC) will be waived up to the LBP amount.

Death Benefit Before Annuity Commencement Date

For both single and joint/spousal election, a death benefit may be available on the death of any owner or annuitant. For joint/spousal election only, no death benefit will be available when a covered life is the beneficiary, and the beneficiary dies. The death benefit provision guarantees that upon death, a death benefit (DB) will be paid equal to the greater of the death benefit or the contract value as of the date proof of death is received. The rider charge is not assessed on death.

When proof of death is processed, the contract will go into suspense mode. No charges will apply during that period. The amount available to be paid as a death benefit under the terms of the rider is a return of the premium adjusted for subsequent premium payments and partial surrenders.

At the rider effective date:
If the rider is effective on the contract issue date, then the DB equals the initial premium.
If the rider is effective after the Contract Issue Date, then the DB equals 100% of the dollar amount of the Contract Value on the Rider effective date, less any bonus payments paid into the contract by the company in the last 12 months.

When a subsequent premium payment is received, the DB will be increased by 100% of the dollar amount of the subsequent premium payment. If the withdrawal feature is revoked, all future withdrawals from the death benefit will be fully proportional as of the date it is revoked.

Whenever a partial surrender is made prior to the contract anniversary immediately following the covered life's $60^{th}$ birthday (or other predetermined age), the death benefit is reduced for an adjustment defined below.

For the "threshold" definition, see the definition described in the section entitled "Calculation of the Payment Base" supra.

For cumulative partial surrenders during each contract year that are equal to or less than the threshold, the adjustment is the dollar amount of the partial surrender. For any partial surrender that first causes cumulative partial surrenders during the contract year to exceed the threshold, the adjustment is the dollar amount of the partial surrender that does not exceed the threshold and the adjustment for the remaining portion of the partial surrender is a factor. The factor is applied to the portion of the death benefit that exceeds the threshold. The factor is defined as follows:

$1-(A/(B-C))$ where

A=partial surrenders during the contract year in excess of the threshold;
B=contract value immediately prior to the partial surrender; and
C=the threshold less any prior partial surrenders during the contract year. If C results in a negative number, C becomes zero.

For partial surrenders during each contract year, where the sum of the prior partial surrenders in the year that are in excess of the threshold, the adjustment is a factor. The factor is applied to the adjusted death benefit immediately before the surrender. The factor is defined as follows:

$1-(A/B)$ where

A=the amount of the partial surrender;
B=contract value immediately prior to the partial surrender.

Whenever a partial surrender is made on or after the contract anniversary immediately following the covered life's $60^{th}$ birthday (or other predetermined age), the DB will be equal to the amount determined as follows:

If the total partial surrenders since the most recent contract anniversary are equal to or less than the current lifetime benefit payment (LBP), the DB becomes the DB immediately prior to the partial surrender, less the amount of partial surrender, less the amount of partial surrender paid out of the general account of the company.

If the total partial surrenders since the most recent contract anniversary are more than the current LBP, but all partial surrenders were paid under the Automatic Income RMD (AI RMD), the DB becomes the DB immediately prior to the partial surrender, less the amount of partial surrender, less the amount of partial surrender paid out of the general account of the company.

If the total partial surrenders since the most recent contract anniversary exceed the total current LBP and the AI RMD exception does not apply, the adjustment is the dollar amount of the partial surrender that does not exceed the LBP, and the adjustment for the remaining portion of the partial surrender is a factor. The factor is applied to the portion of the Death benefit that exceeds the LBP. The factor is as follows:

$1-(A/(B-C))$ where

A=partial surrenders during the contract year in excess of the LBP;
B=contract value immediately prior to the partial surrender.
C=LBP less any prior partial surrenders during the contract year. If C results in a negative number, C=0 (zero).

For partial surrenders during each contract year, where the sum of the prior partial surrenders in the year that are in excess of the current LBP, the adjustment is a factor. The factor for adjustments for partial surrenders for the DB is applied to the adjusted DB immediately before the surrender. The factor is as follows:

$1-(A/B)$ where

A=the amount of the partial surrender;
B=contract value immediately prior to the partial surrender.

Contract Value (CV) Reduces Below Minimum Account Rules

The minimum contract value rules are an optional feature of the present invention and do not apply to the preferred embodiments. If the minimum contract value rules are selected to be applied, then the following rules are used. The minimum contract value (MCV) is defined as 20% or other predetermined percentage of the payment base on the date of a withdrawal request. Lifetime benefit payments cannot reduce the contract value below this minimum threshold.

Only sub-account performance and withdrawals in excess of the LBP can decrease the contract value below the MCV.

If total partial surrenders since the most recent contract anniversary are less than or equal to the difference between the contract value and the MCV, the contract value will be reduced by the total partial surrender.

If the contract Value at the time of a partial surrender is less than or equal to the MCV, the contract value will not be decreased for the partial surrender. The requested partial surrender will be paid out of the general account assets of the company.

If the contract value immediately before the partial surrender is greater than the MCV, but would drop below the MCV after the partial surrender, the contract value will be liquidated to pay the LBP only to the extent it would equal the MCV. The remaining portion of the LBP that is not funded by the contract value will be paid out of the general account assets of the company.

Covered Life Change(s)

Any contractual change before the annuity commencement date (ACD) which causes a change in the covered life will result in a reset in the benefits provided under the rider, and allows fund allocation restrictions to be imposed.

Covered life changes in the first 6 months of the contract issue date (or during another time period) will not cause a change in the DB or PB. However, the WP and LBP may change based on the attained age of the covered life after the covered life change.

If the covered life is changed and a withdrawal has been taken, both within the first 6 months from contract issue date (or during another time period), then the LBP and WP will be calculated at the time of the covered life change and will be based on the new covered life's attained age on the rider effective date.

If the covered life is changed and a withdrawal has not been taken, both within the first 6 months from the contract issue date (or during another time period), then the LBP and WP will be calculated upon the first withdrawal:

If the first withdrawal is after the first 6 months and before the first contract anniversary (or during another time period), then the LBP and WP will be based on the new covered life's attained age on the rider effective date.

If the first withdrawal occurs after the first contract anniversary, then the LBP and WP will be calculated based on the new covered life's attained age on the most recently attained contract anniversary.

If the oldest covered life after the change is greater than the age limitation of the rider at the time of the change, then the rider will terminate, and the death benefit will be equal to the contract value.

Single Life Election:

Covered life changes after the first 6 months of contract issue date will cause a reset in the benefits. If the oldest covered life after the change is equal to or less than the age limitation of the rider at the time of the change, then either below will automatically apply.

If the rider is not currently available for sale, the withdrawal feature of the rider will be revoked.

The existing rider will continue with respect to the death benefit only.

The death benefit will be recalculated to the lesser of the contract value or the DB on the effective date of the covered life change.

The rider charge is assessed on the revocation date, and then will no longer be assessed.

If the rider is currently available for sale, the existing rider will continue with respect to all benefits, at the current contract rider charge.

The PB amount will be reset to the minimum of the contract value or the PB on the date of the change.

The DB will be reset to the minimum of the contract value or the DB on the date of the change The WP and LBP will be recalculated on the date of the change, and will be based upon the following.

A. If withdrawals are taken prior to the first contract anniversary, a new covered life's attained age on the rider effective date will be used.

B. If withdrawals are taken after the first contract anniversary, the new covered life's attained age on the contract anniversary prior to the first withdrawal will be used.

The maximum contract value will be recalculated to equal the contact value on the date of the covered life change.

If the oldest covered life after the change is greater than the age limitation of the rider at the time of the change, the rider will terminate, and the DB will be equal to the contract value. If the rider is no longer available for sale and the issue age of the rider has changed (to be determined on a non-discriminatory basis), and a covered life change occurs, and it exceeds that newly determined age limitation, then rider will terminate, and the death benefit will be equal to contract value.

Joint/Spousal Continuation Elections

Where covered life changes after the first 6 months of contract issue date, and if the owner and owner's spouse are no longer married, for reasons other than death, then covered life changes may occur as follows:

If surrenders have not been taken from the contract, then the PB, the DB and the MCV remain the same; the covered life will be reset and the WP scale will be based on the youngest covered life as of the date of the change. Additionally, the following covered life changes may occur.

Owner may remove spouse as covered life.

Owner may remove spouse as a covered life and replace original spouse with new spouse. (These changes do not have to happen on the same day.)

If surrenders have been taken from the contract, then the following covered life changes may occur.

Owner may remove spouse as covered life.

The PB, the DB and the MCV remain the same.

The WP scale will be based on the attained age of the remaining covered life as of the date of the change.

Any changes other than removing the spouse will follow the rules below.

If the oldest covered life after the change is greater (older) than the age limitation of the rider at the time of the change, then the rider will terminate. The death benefit will be equal to contract value.

If any other contractual change causes a change in the covered life, the following may automatically apply:

If the oldest covered life after the change is equal to or less (younger) than the age limitation of the rider at the time of the change, then the withdrawal feature of the rider will be revoked. The existing rider will continue with respect to the death benefit only. The rider charge is assessed on revocation date, and then will no longer be assessed.

If the oldest covered life after the change is greater (older) than the age limitation of the rider at the time of the change, then the rider will terminate. The death benefit will be equal to the contract value. If the rider is no longer available for sale and the issue age of the rider has been changed (to be determined on a non-discriminatory basis), and a covered life change occurs, and they exceed that newly determined age limitation, then rider will terminate, and the death benefit will be equal to the contract value.

If the spouse dies and is the primary beneficiary and the covered life, then the owner may remove them from the contract. The PB, DB and MCV will remain the same. The WP will be recalculated as follows:

If there has been a partial surrender since the rider effective date, then WP will remain at the current percentage.

If there has not been a partial surrender since the rider effective date, then the WP will be based on the attained age of the remaining covered life on the contract anniversary prior to the first surrender.

Spousal Continuation

Single Life Election:

In the event the contract owner dies and spousal continuation is elected, the contract value will increase to the DB value (the greater of the contract value and the DB). The covered life will be re-determined on the date of the continuation. If the covered life is less than age 81 (or other predetermined age) at the time of the continuation, then either of the following will automatically apply:

If the rider is not currently available for sale, the withdrawal feature of the rider will be revoked. The existing rider will continue with respect to the death benefit only (i.e., the withdrawal feature will terminate). The rider charge is not assessed on the revocation date, and then no longer assessed.

If the rider is currently available for sale, the existing rider will continue with respect to all benefits at the current contract rider charge. The payment base and the death benefit will be set equal to the contract value on the continuation date. The LBP and WP will be recalculated on the continuation date. The WP will be recalculated based on the age of the oldest covered life on the effective date of the spousal continuation. If the WP had previously been locked in, then it will become unlocked and can change based on the next withdrawal. The maximum contract value will be set to the contract value on the continuation date.

If the covered life is greater than or equal to 81 (or other predetermined age) at the time of the continuation, the rider will terminate. The death benefit will be equal to the contract value.

Joint/Spousal Continuation Election

In the event that the contract owner dies and spousal continuation is elected, the contract value will increase to the DB value (the greater of the contract value and the DB). The spouse may do the following.

Continue the Contract and the Rider.

The existing rider will continue with respect to all benefits, at the current contract rider charge. The payment base will be equal to the greater of contract value or payment base on the continuation date. The LBP will be recalculated to equal the withdrawal percent multiplied by the greater of the contract value or the payment base on the continuation date. The maximum contract value will be the greater of the payment base or the contract value on the continuation date. The DB will be equal to the bumped up contract value on the continuation date.

The WP recalculation rule:

The WP will remain at the current percentage if there has been a partial surrender since the rider effective date.

If there has not been a partial surrender, the WP will be based on the attained age of the remaining covered life on the contract anniversary prior to the first surrender/withdrawal.

The contract owner can not name a new owner on the contract. The contract owner can name a new beneficiary on the contract. Any new beneficiary added to the contract will not be taken into consideration as a covered life. The rider will terminate upon the death of the surviving covered life.

Continue the Contract and Revoke the Withdrawal Feature of the Rider.

The charge is assessed on revocation date, and then no longer assessed. The covered life will be re-determined on the date of the continuation date for death benefit purposes. If the covered life is greater than the age limitation at the time of continuation, the rider will terminate. The death benefit will be equal to contract value.

Effect of Death of Owner or Annuitant Before the Annuity Commencement Date.

The following tables describe the effect of the death of the owner or annuitant before the annuity commencement date.

TABLE 1

| | Single Life Election | | |
|---|---|---|---|
| If the Deceased is | And... | And... | Then the... |
| Contract Owner | There is a surviving contract owner | The annuitant is living or deceased | Joint contract owner receives the DB, Rider terminates |
| Contract Owner | There is no surviving Contract Owner | The annuitant is living or deceased | Rider terminates Designated Beneficiary receives DB |
| Contract Owner | There is no surviving Contract Owner or Beneficiary | The annuitant is living or deceased | Rider terminates Estate receives DB |
| Annuitant | Contract Owner is living | There is no contingent annuitant and the contract owner becomes the contingent annuitant | Contract continues, no DB is paid, Rider continues |

TABLE 1-continued

Single Life Election

| If the Deceased is | And... | And... | Then the... |
|---|---|---|---|
| Annuitant | Contract Owner is living | There is no contingent annuitant and the contract owner waives their right become the contingent annuitant | Rider terminates, contract owner receives DB |
| Annuitant | Contract Owner is living | contingent annuitant is living | Contingent annuitant becomes annuitant and the contract and Rider continues |
| Annuitant | Contract Owner is non-natural person | There is no contingent annuitant | Contract owner receives DB, Rider terminates |

Table 2 Joint/Spousal Continuation Election

Contingent Annuitant becomes Annuitant

If the annuitant dies where there is a contingent annuitant (who is different from the owner/annuitant), then the rider continues and all provisions of the rider remain the same, there are no resets nor DBs paid. Upon the death of the last surviving covered life, a DB is paid to the beneficiary, and the rider terminates.

TABLE 2

Joint/Spousal Continuation Election

| If the Deceased is... | And... | And... | Then the... |
|---|---|---|---|
| Contract Owner | There is a surviving contract owner | The annuitant is living or deceased | The surviving contract owner continues the contract and rider, the contract value is increased to the death benefit value. |
| Contract Owner | There is no surviving contract owner | The annuitant is living or deceased | If the spouse is the sole primary beneficiary, follow spousal continuation rules for joint life elections |
| Contract Owner | There is no surviving contract owner or beneficiary | The annuitant is living or deceased | Rider terminates Estate receives DB |
| Annuitant | Contract owner is non-natural person | | If the spouse is the sole primary beneficiary, follow spousal continuation rules for joint life elections |
| Annuitant | The owner is living | There is a living contingent annuitant | The rider continues; upon the death of the last surviving Covered Life, the rider will terminate. |

Effect of Death After the Annuity Commencement Date.

The following table describes the effect of death after the annuity commencement date.

TABLE 3

Single Life Election

| If the Deceased is | And... | And... | Then the... |
|---|---|---|---|
| Annuitant | The annuitant is also the contract owner | Fixed Lifetime and Period Certain is elected | The lifetime contingency ceases. The remaining DB is paid under Period Certain. |

TABLE 4

Joint/Spousal Continuation Election

| If the Deceased is... | And... | And... | Then the... |
|---|---|---|---|
| Annuitant | The annuitant is also the contract owner, and there is no surviving Joint Annuitant | Fixed Lifetime and Period Certain is elected | The lifetime benefit ceases. The remaining DB is paid under Period Certain. |
| Annuitant | The annuitant is also the contract owner, and there is a surviving Joint Annuitant | Fixed Joint and Survivor Lifetime and Period Certain is elected | Lifetime Benefit continues until death of last surviving annuitant |

Fund Allocation Restrictions

The right to restrict investment is reserved in any investment option in the case of a change of covered life after six months. If the investment option restriction is imposed, the contract owner has the following options:

Reallocate all existing money and all new premium to a non-restricted investment option, an available asset allocation program, or fund-of-fund investment option as may be offered from time to time.

Revoke the Withdrawal Feature.

If the restrictions are violated, the withdrawal feature will be revoked. The Death Benefit continues as is upon the date of revocation.

Aggregation

For purposes of determining the PB under the rider, one or more deferred variable annuity contracts issued with the rider attached in the same calendar year can be treated as one contract. If the contracts are aggregated, the period will change over which withdrawals are measured against the benefit payment.

The issuing company will treat the effective date of the election until the end of the calendar year as a contract year for the purposes of the LBP limit. A pro rata rider charge will be taken at the end of that calendar year. As long as total withdrawals in that period do not exceed the LBP, the withdrawals will not necessitate a reset.

In future calendar years, the LBP limits will be aggregated and will be on a calendar year basis. In other words, withdrawals under all aggregated contracts in a calendar year will be compared against the combined LBP limits for the aggregated contracts. If withdrawals exceed those combined limits, the aggregate PB will be set to the combined contract values of the aggregated contracts. The LBP will then equal withdrawal percent multiplied by the new PB.

If withdrawals do not exceed those combined limits, each withdrawal will reduce the PB dollar for dollar. The withdrawal benefits relating to the contract value reaching zero will not apply until the contract value of all aggregated contracts reaches zero.

The rider charge will be taken at the end of each calendar year. It will be deducted pro rata from all of the sub-accounts and fixed accounts of the aggregated contracts. If the contract values of all aggregated contracts are reduced below our minimum account rules in effect, the annuity options will be offered as defined earlier in this specification. The options will pay the combined LBP.

Annuity Commencement Date

If the annuity reaches the maximum ACD, which is the later of the $10^{th}$ contract anniversary and the date the annuitant reaches age 90, the contract must be annuitized unless it is agreed upon to extend the ACD. In this circumstance, the contract may be annuitized under standard annuitization rules, but under no circumstances will the amount payable be less than the LBP, provided that the certain period does not exceed the Death Benefit remaining at the ACD divided by the LBP.

Single Life Election:

A fixed lifetime and Period Certain Payout will be issued. The lifetime portion will be based on the Covered Life determined at ACD. The Covered Life is the Annuitant for this payout option. If there is more than one Covered Life, then the lifetime portion will be based on both Covered Lives. The Covered Lives will be the Annuitant and Joint Annuitant for this payout option. The lifetime portion will terminate on the first death of the two. The minimum amount paid to owner under this Annuity Option will at least equal the remaining DB under this rider.

If the oldest Annuitant is age 59 (or other predetermined age) or younger, the date the payments begin will be deferred until the oldest Annuitant attains age 60 (or other predetermined age) and is eligible to receive payments in a fixed dollar amount until the later of the death of any Annuitant or a minimum number of years.

If the Annuitant(s) are alive and age 60 (or other predetermined age) or older, payments will be received in a fixed dollar amount until the later of the death of any Annuitant or a minimum number of years. The minimum number of years that payments will be made is equal to the remaining DB under this rider divided by the product of the payment base on the ACD multiplied by the greater of the WP and 5% Single (4½% Spousal).

Single Election:

$$\frac{DB}{PB \times \text{Max}(WP, 5\%)}$$

Joint/Spousal Election:

$$\frac{DB}{PB \times \text{Max}\left(WP, 4\frac{1}{2}\%\right)}$$

This annualized amount will be paid over the greater of the minimum number of years, or until the death of any Annuitant, in the frequency that is elected. The frequencies will be among those offered at that time but will be no less frequent than annually. If, at the death of any Annuitant, payments have been made for less than the minimum number of years, the remaining scheduled period certain payments will be made to the Beneficiary. A lump sum option is not available.

Joint/Spousal Continuation Election:

The minimum amount paid to owner under this Annuity Option will at least equal the DB under this rider. If the younger Annuitant is alive and age 59 (or other predetermined age) or younger, the date that payments begin will be automatically deferred until the younger Annuitant attains age 60 (or other predetermined age) and is eligible to receive payments in a fixed dollar amount until the death of the last surviving Annuitant or a minimum number of years.

If the Annuitants are alive and the younger Annuitant is age 60 or older (or other predetermined age), payments will be received in a fixed dollar amount until the death of the last surviving Annuitant or a minimum number of years. The minimum number of years that payments will be made is equal to the remaining DB under this rider divided by the LBP at annuitization. This annualized amount will be paid over the greater of the minimum number of years, or until the death of the last surviving Annuitant, in the frequency that is elected. The frequencies will be among those offered at that time but will be no less frequent than annually. If, at the death of the last surviving Annuitant, payments have been made for less than the minimum number of years, the remaining scheduled period certain payments will be made to the Beneficiary. A lump sum option is not available.

If both spouses are alive, the owner will be issued a Fixed Joint & Survivor Lifetime and Period Certain Payout. The Covered Life and Covered Life's spouse will be the Annuitant and Joint Annuitant for this payout option. The lifetime benefit will terminate on the last death of the two. If one spouse is alive, the owner will be issued a Fixed Lifetime and Period Certain Payout. The lifetime portion will be based on the Covered Life. The Covered Life is the Annuitant for this payout option. The lifetime benefit will terminate on the last death of the Covered Life.

Premium Restrictions

Prior company approval is required on all subsequent premium payments received after the first 12 months. The approval rules are as follows.

Any subsequent premium(s) will not be accepted if it brings the total cumulative subsequent premiums in excess of $100,000 without prior approval.

Payment enhancements and employee gross-up are not to be included in premium total.

Revoking the Withdrawal Feature

In one embodiment, at any time following the earlier of Spousal Continuation or the fifth anniversary of the Rider effective date, the Contract Owner may elect to revoke the Withdrawal Feature of the Rider. The Payment Base will go to zero and the Withdrawal Percent will go to Zero, and LBP will go to Zero.

On the date the withdrawal feature is revoked, a pro rata share of the Rider charge is equal to the Rider charge percentage multiplied by the PB, multiplied by the number of days since the last charge was assessed, divided by 365. The Rider Charge will be assessed on the revocation date, and then will no longer be assessed. The Death Benefit continues as is upon the date of the revocation. No other living benefit may be elected upon the revocation of the Withdrawal Feature.

In another embodiment, the Contract Owner can not elect to revoke the withdrawal Feature. However, the Withdrawal Feature can be revoked in certain circumstances by the issuing company.

Additional Annuity Contract(s) Rules

Additional terms of the contract(s) or rider(s) include the following. The benefits under the contract cannot be assigned. If the free look provision under the contract is exercised, the rider will terminate.

Subject to state approval, a rider will be made available on all currently available products issued on or after the date the rider is launched for sale in the state of issue. This does not imply post-issue election. Post-issue election will be determined on an as needed basis.

Regarding post-issue election, ff the rider effective date is after the contract issue date, then the period between the rider effective date and the next contract anniversary will constitute a contract year.

If the rider effective date is after the contract issue date, then the period between the rider effective date and the next contract anniversary will constitute a contract year.

The following product-specific features and impacts are applicable. The employee gross-up is not considered premium for purposes of the payment base and death benefit. Payment enhancements are not considered premium for purposes of the payment base and death benefit. Front-end loads are not taken from the premium for purposes of the payment base and death benefit.

Turning now to the figures, FIG. 1 illustrates the manner in which a new annuity contract application is processed. The new application processing routine starts (block 102) when an application is completed. The annuity contract application and initial premium are received by the insurance company (block 104). The annuity contract is then established through the contract establishing routine (block 106) as further described in FIG. 2. After the annuity contract is established, the account value is then set up through the account value set routine (block 108), via the computer systems, as further specified in FIG. 3. Thereafter customer communication is established through the customer communication routine (block 110) as further specified in FIG. 4. The application processing routine ends at (block 112).

Figure 2:
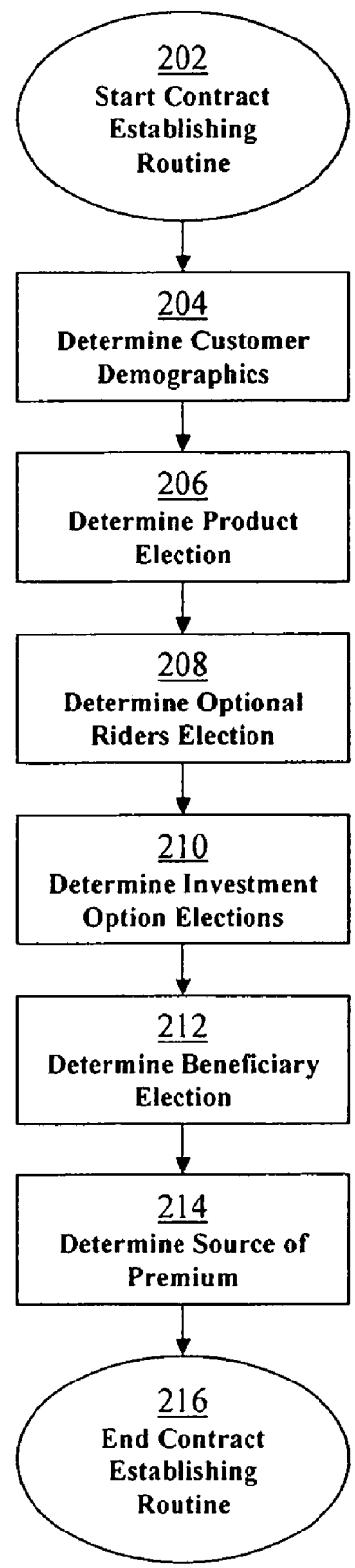
FIG. 2 is a flow chart that illustrates in more detail the manner in which an annuity contract is established.

FIG. 2 is a flow chart that illustrates in more detail the manner in which an annuity contract is established. The annuity contract establishing routine starts at (block 202). After receiving the annuity contract application, customer demographics are determined (block 204). The customer demographics and other data from the annuity contract application are transmitted to the insurance company by any suitable means, such as electronic transmission, facsimile transmission, telephonic transmission, and the like. The customer demographics may be scanned in or electronically entered into the computer system by the insurance company after the demographic data is determined. Such demographic information may include age, gender, date of birth, social security number, address, marital status, and the like. The customer demographics may be used for a variety of purposes, such as identification purposes or to locate a relevant life by searching his/her social security number. The customer demographics are also used when determining and/or calculating a variety of factors that are related to the annuity contract, such as benefit amount calculations, tax considerations, and the like. The types of customer demographics that are determined are generally related to the type of annuity contract application that is filled out by the relevant life. The specific product election is determined (block 206). For example, the specific product may be elected from a group of different variable annuity products, which each have different characteristics including the costs and fees as well as the liquidity features associated therewith. The election of optional riders is determined (block 208). For example, the optional riders may be elected from a group of different riders, which each have various guaranteed withdrawal features. The election of investment options is determined (block 210). For example, the investment options include money market funds, bond funds, stock funds, and the like. The beneficiary is elected (block 212). In one aspect, this is the person who will collect the death benefits, if any. The source of the premium is determined (block 214). For example, the source of the premium may come from the relevant life's personal funds or may come from another annuity in the form of a transfer. It should be understood that the steps taken for establishing the contract may proceed in various orders and that the order shown in FIG. 2 is for illustrative purposes only and is only one embodiment of said steps. The contract establishing routine ends at (block 216).

Figure 3:
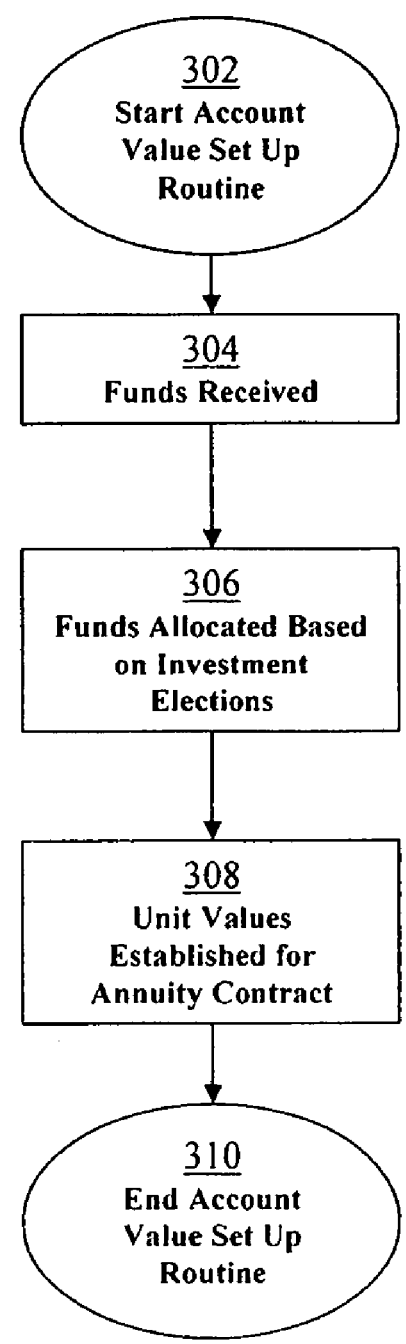
FIG. 3 is a flow chart that illustrates in more detail the manner in which an account value is set up.

FIG. 3 is a flow chart that illustrates in more detail the manner in which an account value is set up. The account value set up routine starts at (block 302). The funds are received (block 304). For example, the funds may be received via electronic transfer from a bank account or from another variable annuity holder. The funds are then allocated based on investment elections (block 306). For example, the allocations can be accomplished through a computerized system according to the investment elections by the relevant life. Unit values are established for the annuity contract (block 308). For example, based on the performance of the underlying investment elections, unit values are established, preferably on a daily basis, for use in determining the resulting impact on the relevant life's annuity contract based on their specific fund allocations. For example the number of units that are applied to each annuity contract is different for each relevant life based on the number of units held within the annuity contract. It should be understood that the steps taken for setting up the account value may proceed in various orders and that the order shown in FIG. 3 is for illustrative purposes only and is only one embodiment of said steps. The account value set up routine ends at (block 310).

Figure 4:
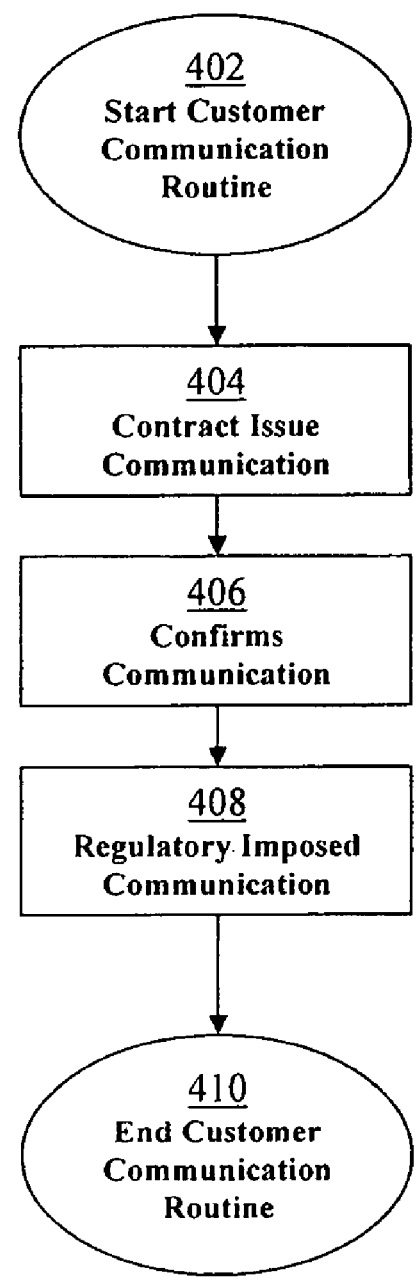
FIG. 4 is a flow chart that illustrates in more detail the manner in which customer communication is established.

FIG. 4 is a flow chart that illustrates in more detail the manner in which customer communication is established. The customer communication routine starts at (block 402). Communications with the customer may be accomplished via email, facsimile, letter, telephone, and the like. Communication with the customer in one aspect relates to the issuing of the contract (block 404). Communication with the customer in one aspect relates to the relevant confirmation of the previous contract issuance communication (block 406). Any regulatory-imposed communication with the client is accomplished (block 408), it should be understood that the steps taken for establishing customer communication may proceed in various orders and that the order shown in FIG. 4 is for illustrative purposes only and is only one embodiment of said steps. The customer communication routine ends at (block 410).

Figure 5:
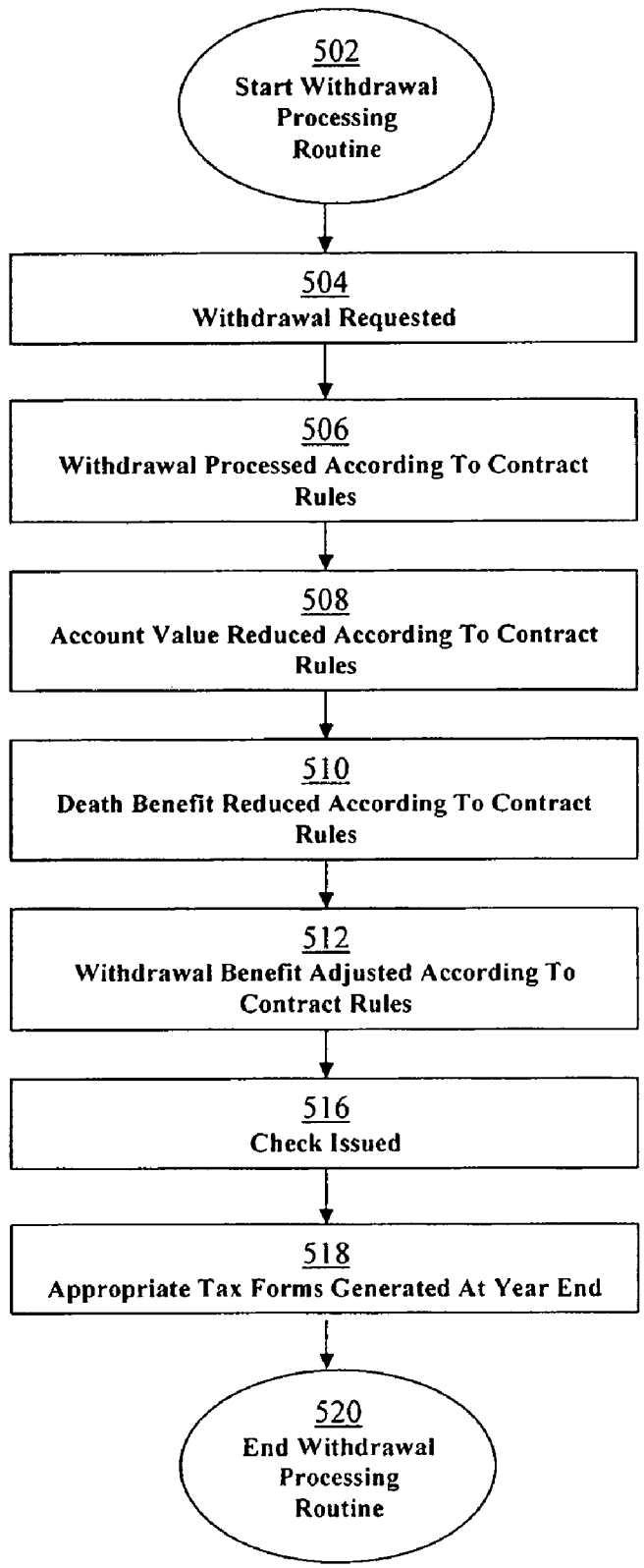
FIG. 5 is a flow chart illustrating the appropriate steps after a withdrawal is requested.

FIG. 5 is a flow chart illustrating the appropriate steps after a withdrawal is requested. The withdrawal processing routine starts at (block 502). A withdrawal is first requested by the relevant life at (block 504). The withdrawal is then processed according to the contract rules (block 506). The contract rules are embedded in a computer system or the like and vary according to the type of annuity contract. For example, in certain embodiments, a requested withdrawal amount by the relevant life may be limited by the contract rules to a specific withdrawal percent that is applied by the computer system, and wherein the contract rules specify the withdrawal percent according to the age of the relevant life or the number of years since the contract was established. Therefore, the contract rules govern the data flow in the computer system. The contract rules are administratively built into the computer system to obviate the need for manual intervention by the insurance company. The account value is reduced according to the contract rules (block 508). The death benefit is reduced according to the contract rules (block 510). The withdrawal benefit is adjusted according to the contract rules (block 512). The check or other form of payment is issued (block 516). The appropriate tax forms are generated at year end (block 518). It should be understood that the steps taken for processing withdrawals may proceed in various orders and that the order shown in FIG. 5 is for illustrative purposes only and is only one embodiment of said steps. The withdrawal processing routine ends at (block 520).

Figure 6:
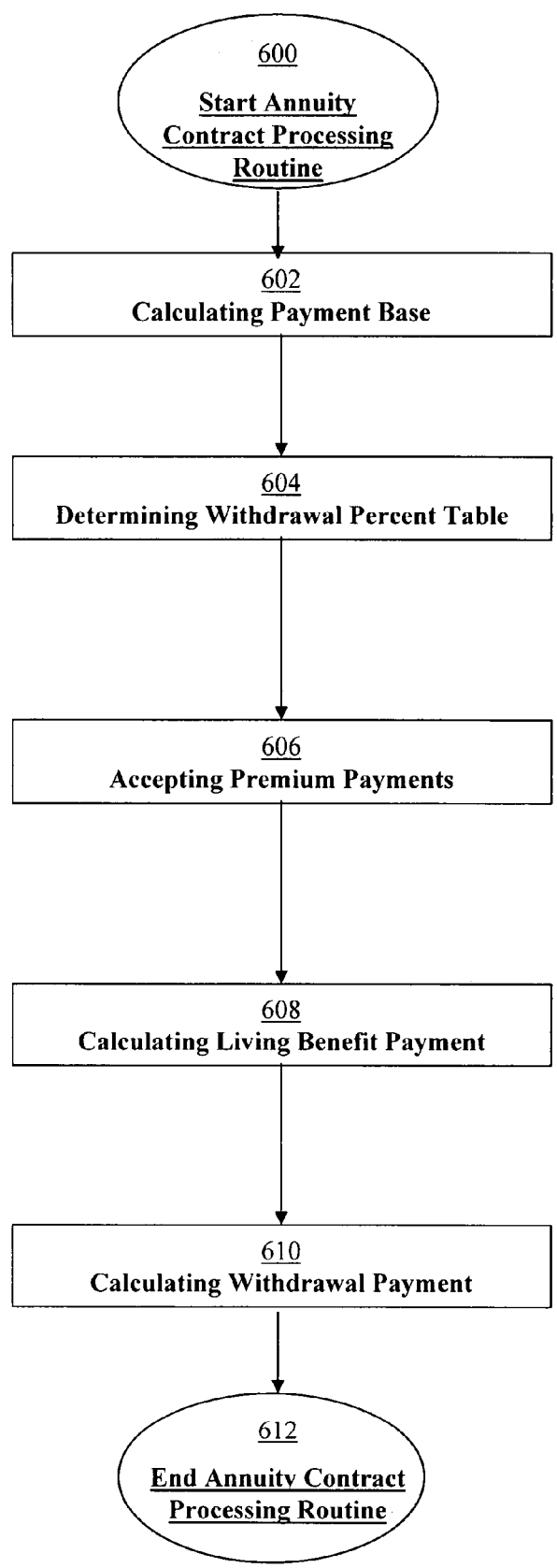
FIG. 6 is a flow chart illustrating a preferred embodiment of the present invention comprising a data processing method for administering an annuity contract for a relevant life.

FIG. 6 is a flow chart illustrating a preferred embodiment of the present invention comprising a data processing method for administering a deferred variable annuity contract for a relevant life. It should be understood that the order of the successive method steps in each Figure herein is shown for the sake of illustrating but one example, and that the order of method steps can proceed in any variety of orders. In one embodiment of the present invention, the invention comprises a data processing method for administering a deferred variable annuity contract for a relevant life, the annuity product having a payment base, a contract value and lifetime benefit payments.

The annuity contract processing routine starts (block 600), and the method sometime later enters the calculation of the payment base phase (block 602) that is preferably a function of the previous premium payments and withdrawals by the relevant life. The present method determines a withdrawal percent table that provides a particular withdrawal percent based on each birthday of the relevant life (block 604). If requested by the relevant life, the present method periodically accepts premium payments from the relevant life (block 606) which increase the payment base and the contract value. If requested by the relevant life and the covered life is older than a predetermined age (i.e. 60 years old), the present method periodically calculates a lifetime benefit payment for the relevant life (block 608) which decreases the contract value. If requested by the relevant life, the present method periodically calculates a withdrawal payment (block 610)—that is in excess of the lifetime benefit payment—to the relevant life from the contract value which decreases each of: the contract value and the payment base. Preferably, the lifetime benefit payment is determined by the following formula:

$$LBP \text{ withdrawal} = (\text{the Withdrawal Percent}) \times (\text{a Withdrawal Base}) \times (\text{an Adjustment Factor}),$$

wherein the withdrawal percent is predetermined according to a withdrawal percent table and wherein the adjustment factor is modified over time. Preferably the adjustment factor is related to the number of deferred years waited by the relevant life until a first lifetime benefit payment withdrawal is requested.

Figure 7:
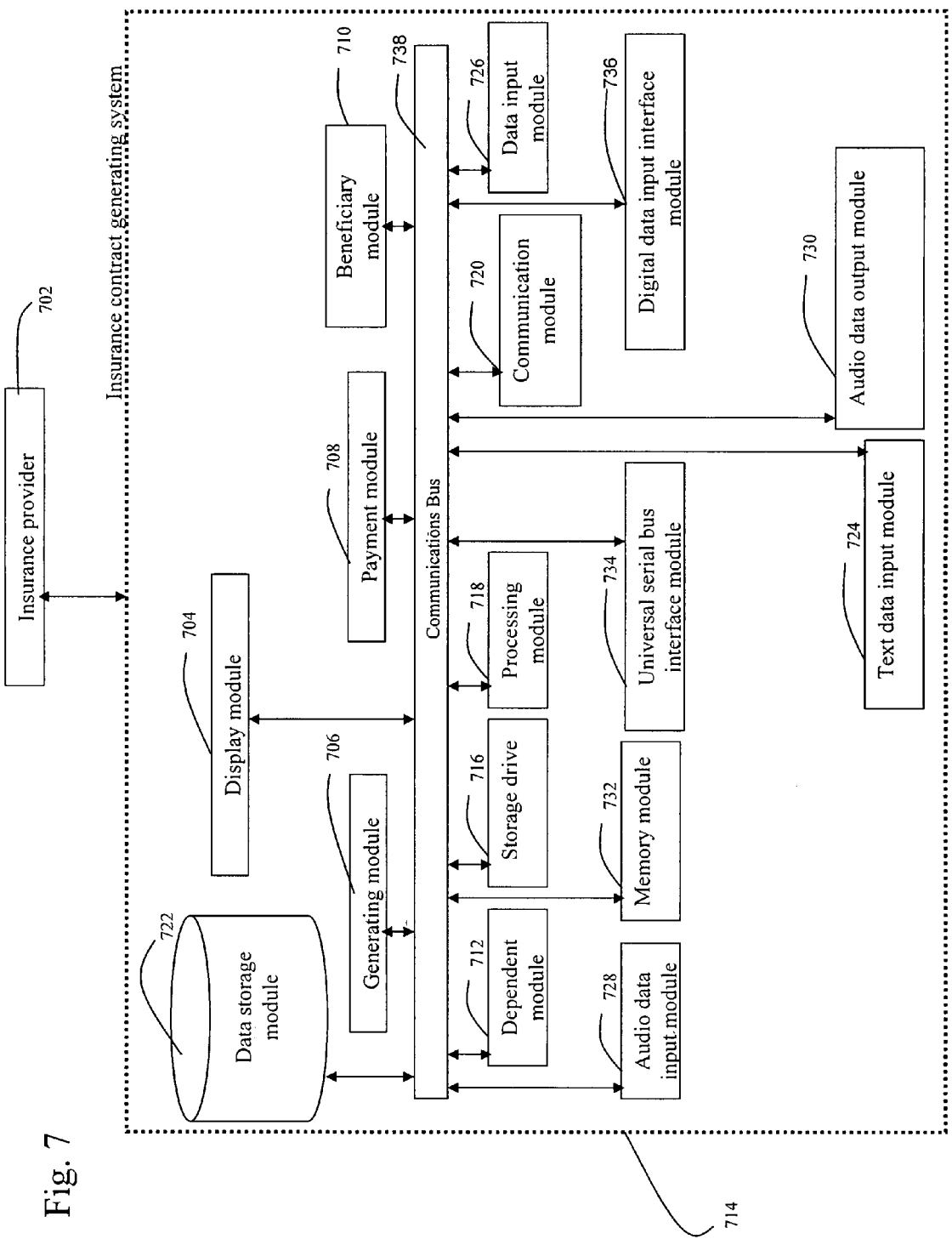
FIG. 7 is a diagram illustrating the system on which the methods of the present invention may be implemented in accordance with an embodiment of the present invention.

Referring next to FIG. 7, depicted is a preferred embodiment of a system on which the methods of the present invention may be implemented. In one example of the preferred embodiment, the insurance contract generating system 714 would generally be used by an insurance provider 702, however the system may be operated by any individual or organization offering an insurance product as outlined in the present specification without departing from the spirit of the present invention. System 714 may be implemented in many different ways such as part of a single standalone server or as a network server or servers, which may be distributed across multiple computing systems and architectures. Preferably, the central processing computer or network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server.

The network server may also be configured in a distributed architecture, wherein the server components or modules are housed in separate units or locations. Each of the modules described may be implemented as single servers or one or more or all of the modules may be incorporated into a single server. These servers will perform primary processing functions and contain at a minimum, a RAM, a ROM, and a general controller or processor: In such an embodiment, each server is connected to a communications hub or port that serves as a primary communication link with other servers, clients or user computers and other related devices. The communications hub or port may have minimal processing capability itself, serving primarily as a communications router. A variety of communications protocols may be part of the system, including but not limited to: Ethernet, SAP, SAS.™., ATP, Bluetooth, GSM and TCP/IP.

In the preferred embodiment, all of the modules described herein are operably inter-connected via a central communications bus 738. The communications bus 738 is able to receive information from each of the modules, as well as to transmit information from one module to another. The insurance contract generating system 714 further includes a display module 704, and a generating module 706. The generating module is used for generating an insurance contract, wherein the insurance contract provides coverage to an individual or group for at least one event defined in the insurance contract.

The insurance contract generating system 714 additionally includes a payment module 708 for making payments to an insured individual or group for a predetermined period of time as defined by the deferred annuity insurance contract.

The system further comprises a beneficiary module 710 for choosing a beneficiary to receive payments from the insurance provider in the instance of an insured individual's death. Furthermore, the system comprises a dependent module 712 for offering an insurance contract structured according to the methods of the present invention to dependents of an individual eligible for the insurance contract described herein.

Additionally, the insurance contract generating system 714 includes: a storage drive 716 for receiving data stored on a storage disc, a processing module 718 for processing digital data received by and contained in the insurance contract generating system 714, a communication module 720 for bidirectional communication with external and telecommunications systems, a data storage module 722 for storing and managing digital information, a text data input module 724 for inputting data in the form of text, and a data input module 726 for converting to digital format documents and images and inputting them into the insurance contract generating system 714.

Finally, the insurance contract generating system 714 includes: an audio data input module 728 for receiving and inputting audio information, an audio data output module 730 for outputting data in audio format (i.e. recorded speech, synthetically generated speech from digital text, etc), a memory module 732 for temporarily storing information as it is being processed by the processing module 718, a universal serial bus interface module 734 for receiving and transmitting data to and from devices capable of establishing a universal serial bus connection, and a digital data input interface module 736 for receiving data contained in digital storage devices.

Data storage device may include a hard magnetic disk drive, tape, optical storage units, CD-ROM drives, or flash memory. Such data storage devices generally contain databases used in processing transactions and/or calculations in accordance with the present invention. In one embodiment, the database software creates and manages these databases. Insurance-related calculations and/or algorithms of the present invention are stored in storage device and executed by the CPU.

The data storage device may also store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, and each record includes fields that are specific to the present invention such as interest rates, contract value, payment base value, step-ups, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as providing a deferred annuity insurance contract to an individual, generating a deferred annuity insurance contract, and making payments to the individual as defined in the deferred annuity insurance contract. The functions described above are merely exemplary and should not be considered exhaustive of the type of function, which may be performed by the computer program code of the present inventions.

The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

For example, a user provides instructions for the amount of the living benefit payment that is requested. It should be understood that the user may communicate with the computing system directly or indirectly through another party, such as the insurance provider 702. In the event the user communicates with an insurance provider 702, the insurance provider 702 than receives and transfers information, to and from the insurance contract generating system 714 via the text data input module 724, audio data input module 728, audio data output module 730 and the display module 704. For example, the relevant life may provide instructions to the insurance provider 702 indicating the amount of living benefit payments the relevant life would like to receive. Furthermore, as used herein the data storage module 722 is also referred to as a storage device. The processing module 718 is contained within the insurance contract generating system 714, which is coupled to the storage device, the storage device stores instructions that are utilized by the processor. The instructions comprise: (i) an instruction for calculating a payment base; (ii) an instruction for calculating a contract value; (iii) an instruction for determining a withdrawal percent table that provides a particular withdrawal percent based on the age of the relevant life; and (iv) an instruction for calculating a lifetime benefit payment; wherein the lifetime benefit payment withdrawal is determined by the following formula:

$$LBP\ \text{withdrawal} = (\text{a Withdrawal Percent}) \times (\text{a Withdrawal Base}),$$

wherein the withdrawal percent is predetermined according to a withdrawal percent table and wherein the adjustment factor is modified over time.

Figure 8:
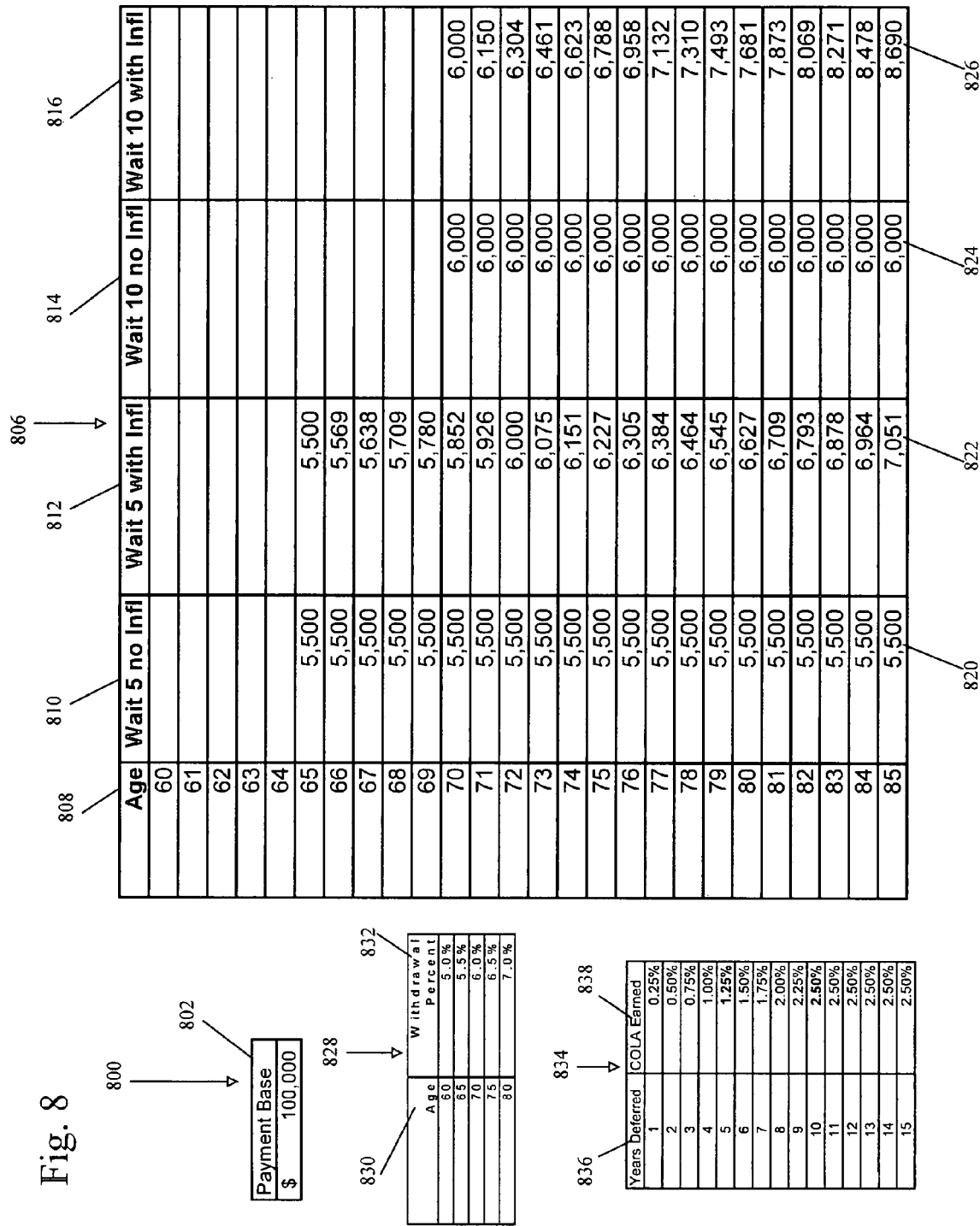
FIG. 8 depicts a table illustrating lifetime benefit payments issued to the relevant life for annuities associated with various lifetime benefit plans along with a three supplemental tables in accordance with an embodiment of the present invention.

Turning now to FIG. 8, shown are supplemental tables 800, 828, and 834, wherein each table illustrates exemplary values, which are strictly for the purposes of illustration and are not meant to limit the scope of the invention. Supplemental table 800 illustrates the initial investment or payment base 802 invested by the relevant life. For this example, payment base 802 is $100,000. Supplemental table 828 illustrates various withdrawal percents 832, wherein each withdrawal percent 832 directly corresponds to a range of ages 830. Supplemental table 834 illustrates various Cost of Living Allowance (COLA) inflation percents 838, wherein each COLA inflation percent 838 corresponds to the number of years 836 the lifetime benefit payment is deferred by the relevant life. For example, if the relevant life decides to defer the lifetime benefit payment for 3 years, whereby the relevant life withdraws the first lifetime benefit payment on the fourth year, the relevant life is entitled to an additional 0.75% withdrawal rate for each subsequent lifetime benefit payment withdrawal. Accordingly, supplemental tables 800, 828, and 834 provide information that is pertinent to the example illustrated by table 806.

Referring now to table 806, illustrated are exemplary lifetime benefit payments 820, 822, 824, and 826 as function of age for annuities paid to the relevant life under various benefit plans. More specifically, "Wait 5 no Infl" column 810 represents lifetime benefit payments 820 withdrawn by the relevant life, whereby the relevant life deferred the first five lifetime benefit payments 820. Thus, in this example, the relevant life collected the first lifetime benefit payment 820 on the sixth year of eligibility, wherein the first year of eligibility occurred within the year the relevant life turned 60, as indicated by "Age" column 808. Hence, the relevant life withdrew the first lifetime benefit payment 820 at the age of 65. Consequently, by applying the information from supplemental tables 800 and 828, the relevant life is entitled to a 5.5% withdrawal rate of payment base 802 (i.e. $100,000).

Supplemental table 834 is purposely not incorporated into the example illustrated by column 810 in order to demonstrate the benefits of the present invention. Therefore, the relevant life receives $5,500 a year for 21 years. "Wait 5 with Infl" column 812 illustrates lifetime benefit payments 822 withdrawn by the relevant life, whereby the relevant life deferred the first five lifetime benefit payments 822. Thus, the relevant life collected the first lifetime benefit payment 822 on the sixth year of eligibility. Hence, the relevant life withdrew the first lifetime benefit payment 822 at the age of 65. Consequently, by implementing the information from supplemental tables 800, 828, and 834, the relevant life is entitled to a 5.5% withdrawal percent 832 of payment base 802 (i.e. $100,000) on the first year, which equates to a lifetime benefit payment 822 of $5,500. Additionally, for each subsequent year, the relevant life is entitled to apply an additional COLA inflation percent 838 to the previous lifetime benefit payment. For this example, since the relevant life deferred the first five years of lifetime benefit payments 822, the COLA inflation percent 838 that the relevant life is entitled to is 1.25% as illustrated by supplemental table 834. Therefore, at the age of 66, the relevant life will receive an additional 1.25% of $5,500, the initial lifetime benefit payment 822. Consequently, the total lifetime benefit payment 822 that the relevant life will receive at the age of 66 is $5,569. This process repeats until the last lifetime benefit payment 822 is withdrawn by the relevant life (i.e. the year the relevant life turns 85), wherein the lifetime benefit payment 822 has reached $7,051. "Wait 10 no Infl" column 814 illustrates lifetime benefit payments 824 withdrawn by the relevant life, whereby the relevant life deferred the first ten lifetime benefit payments 824. "Wait 10 no Infl" column 814 follows the same principles as extensively discussed above when describing "Wait 5 no Infl" column 810, the only difference is that the relevant life defers an additional five years (a total of 10 years deferred) before lifetime benefit payments 824 are withdrawn. By applying the information supplied by supplemental tables 800 and 828, and as illustrated by table 806 the relevant life is entitled to a 6.0% withdrawal percent 832 of payment base 802 (i.e. $100,000). Thus, the relevant life receives a total of 16 lifetime benefit payments 824 of $6,000. Accordingly, "Wait 10 with Infl" column 816 follows the same principles as extensively discussed above when describing "Wait 5 with Infl" column 812, the only difference is that the relevant life defers an additional five years (a total of 10 years deferred) before collecting the first lifetime benefit payment 826. Consequently, by applying the information supplied by supplemental tables 800, 828 and 834, and as illustrated by table 806, the relevant life is entitled to a 6.0% withdrawal percent 832 of payment base 802 (i.e. $100,000). Thus, the first lifetime benefit payment 826 withdrawn by the relevant life is in the amount of $6,000, however a COLA inflation percent 838 of 2.50% is applied to each previous lifetime benefit payment 826 in order to calculate each subsequent lifetime benefit 826 in which the relevant life is entitled. For example at the age of 71, the relevant life receives a lifetime benefit payment 826 in the amount of $6,150. Additionally, "Age" column 808 tracks the age of the relevant life in years. For this example, table 806 illustrates a range between 60 and 85 years of age, however the invention should not be limited to this range. Furthermore, although the age of the relevant life is represented in years, various other periods of time may be used (i.e. days, weeks, months, decades, etc.).

Figure 9:
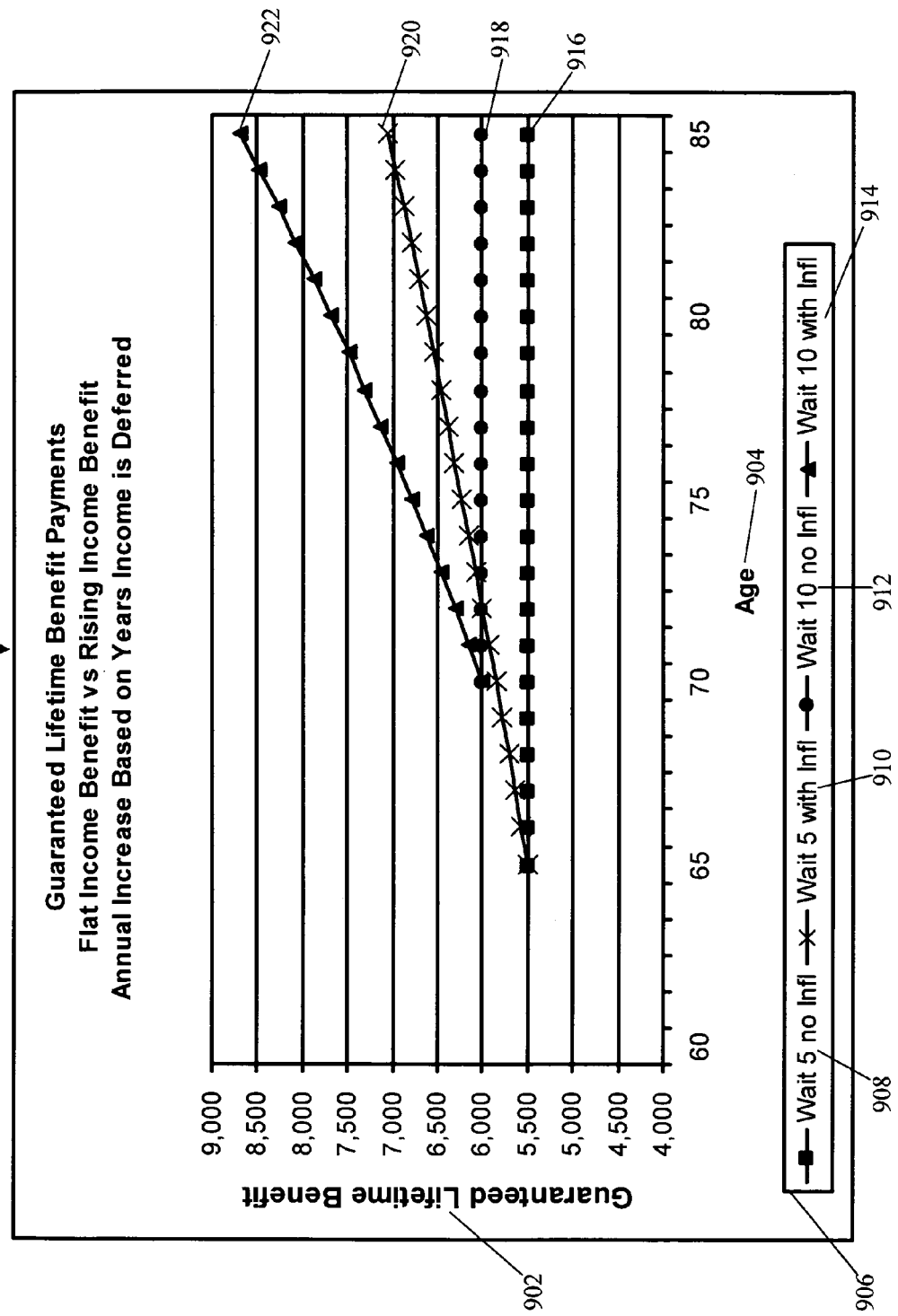
FIG. 9 depicts a graph illustrating lifetime benefit payments issued to the relevant life for annuities associated with various lifetime benefit plans in accordance with an embodiment of the present invention.

FIG. 9 illustrates a graph 900, titled "Guaranteed Lifetime Benefit Payments—Flat Income Benefit vs Rising Income Benefit—Annual Increase Based on Years Income is Deferred," which further illustrates the example represented by table 806 of FIG. 8. More specifically, graph 900 includes a "Guaranteed Lifetime Benefit" or withdrawal scale 902, which illustrates withdrawal values or lifetime benefit payments 916, 918, 920, and 922 as a function of age 904 during a 26 year period. Ages 904 ranging from 60 to 85 are illustrated on the x-coordinate of graph 900 so as to accurately correspond to table 806 of FIG. 8. Essentially, graph 900 visually illustrates the example represented by table 806 of FIG. 8. The key 906 provided by FIG. 9 illustrates the symbols used to represent which line on graph 900 corresponds to the respective column of table 806. More specifically, "Wait 5 no Infl" column 810 is graphically illustrated on graph 900 by "Wait 5 no Infl" line 908, which is represented by a line containing squares. For example, the year in which the relevant life turns 65, "Wait 5 no Infl" line 908 accurately illustrates a lifetime benefit payment 916 of $5,500. Furthermore, "Wait 5 no Infl" line 908 remains at $5,500 with respect to the relevant life's age throughout graph 900, thus, accurately expressing lifetime benefit payments 820 of "Wait 5 no Infl" column 810 of table 806. Additionally, graph 900 visually illustrates each of the remaining above-referenced columns 812, 814, and 816 by lines 910, 912, and 914 respectively. Therefore, each line 908, 910, 912, and 914 illustrated on graph 900 directly corresponds to each of the above-referenced columns 810, 812, 814, and 816 of table 806, respectively.

In one embodiment of the present invention, the payment base is related to premium payments by the relevant life wherein some of the premium payments may be discretionary. In one embodiment, the lifetime benefit payment is dependent on a predetermined withdrawal percent table that is determined by the company issuing the annuity and/or the relevant life. Preferably, the withdrawal percent is based on the attained age of the relevant life and is provided according to the predetermined withdrawal percent table that is predetermined by the company issuing the annuity.

Further, the adjustment factor is preferably determined by a formula that is related to the number of deferred years waited by the relevant life until a first lifetime benefit payment withdrawal is requested. The formula for determining the adjustment factor is predetermined by the company issuing the annuity. In a preferred embodiment the adjustment factor is determined by the following formula:

Inflation Adjustment Factor=[1+(a predetermined factor)×(the number of deferred years waited by the relevant life until a first lifetime benefit payment withdrawal is requested)]$^Y$, wherein $Y$ is equal to (the number of the lifetime benefit payment withdrawal year, wherein the year of the first lifetime benefit payment withdrawal is set as year number 1).

Preferably, the predetermined factor is in the range of 0%-5.0%. More preferably, the predetermined factor is in the range of 0.05%-2.0%. Most preferably, the predetermined factor is equal to 0.25%.

In a preferred embodiment, (the Withdrawal Percent)×(the adjustment factor) must be equal to or less then a predetermined maximum percent. Preferably, the predetermined maximum percent is in the range of 0% to 25.0%. More preferably, the predetermined maximum percent is in the range of 1.0% to 15.0%. Most preferably, the predetermined maximum percent is equal to 10.0%.

The annuity commencement date is discretionary and is selected by the company issuing the annuity and/or the relevant life, with certain restrictions. The initial guaranteed death benefit amount is discretionary and is determined by the company issuing the annuity and/or the relevant life. Preferably, the company issuing the annuity sets the initial guaranteed death benefit amount for calculation purposes. In a preferred embodiment, the initial guaranteed death benefit amount is equal to the payment base.

The lifetime benefit payment is paid periodically, such as yearly, quarterly, monthly, weekly, etc. The lifetime benefit payment that is requested by the relevant life for a given period may be any amount greater than zero and equal to or less than the (the Withdrawal Percent)×(a Withdrawal Base)× (an adjustment factor), wherein the Withdrawal Percent is predetermined according to a withdrawal percent table and wherein the adjustment factor is modified over time, and preferably related to the number of deferred years waited by the relevant life until a first lifetime benefit payment withdrawal is requested. The available lifetime benefit payment is determined at each period by the aforementioned formula. In a preferred embodiment, the relevant life does not have to wait for the contract anniversary date in order to request the withdrawal percent that corresponds to his attained age as provided by a predetermined withdrawal percent table.

The withdrawal base may be equal to the amount of the original premium, the Payment Base, the Contract Value, or the greater of the Payment Base and the Contract Value. In most cases, the value of (the Payment Base)×(the Withdrawal Percent)×(the adjustment factor) will not be equal to (the present Contract Value)×(the Withdrawal Percent)×(the adjustment factor). Therefore, in some embodiments the higher of these two values is the highest available lifetime benefit payment available for that period. However, the relevant life does not have to elect the highest possible available lifetime benefit payment. The value that is requested, if any, for the lifetime benefit payment for that period will be subtracted from the contract value, but not from the payment base. Therefore, the higher the lifetime benefit payment requested for a period, then the greater the possible impact on the value of (the present Contract Value)×(the Withdrawal Percent)×(the adjustment factor) for the subsequent period.

Preferably, the withdrawal percent is a function of the relevant life's age; in other words, the withdrawal percent increases with the age of the relevant life and is provided by the predetermined withdrawal percent table. In one embodiment, once the relevant life must be a minimum age to begin taking lifetime benefit payments.

In one embodiment, the withdrawal percent table has a minimum withdrawal percent of 5% for any given attained age. Other minimum withdrawal percents may be used. Preferably, the first few number of attained age years after the minimum age to begin taking lifetime benefit payments that are listed in the withdrawal percent table are set to the minimum withdrawal percent value. Preferably, each of the attained age years of 60-64 has a 5% withdrawal percent.

In one embodiment, the withdrawal percent table has a maximum withdrawal percent of 7.0% for any given attained age year. Other maximum withdrawal percents may be used. Preferably, the withdrawal percents increase as the relevant life ages until the maximum withdrawal percent is reached. Preferably, each of the attained age years equal to or greater than 80 years old of the withdrawal percent table has a 7.0% withdrawal percent.

In a preferred embodiment, the withdrawal percent table is as follows:

| Attained Age of Relevant Life | Available Withdrawal Percentage |
|---|---|
| 60-64 | 5.0% |
| 65-69 | 5.5% |
| 70-74 | 6.0% |
| 75-79 | 6.5% |
| 80 and above | 7.0% |

In one embodiment, once the first lifetime benefit payment withdrawal is taken, then the withdrawal percent is fixed for the remainder of the contract. In another embodiment, the withdrawal percent continues to rise with the relevant life's age, no matter if the relevant life has already begun to take lifetime benefit payments. In another embodiment, the withdrawal percent may either increase or decrease over the term of the annuity. Alternatively, the withdrawal percent may fluctuate over the term of the annuity.

In a further embodiment, the present method further comprises the step of collecting a rider fee or collecting an account maintenance fee. In another embodiment, the present method further comprises the step of: calculating a death benefit for a beneficiary upon the death of the relevant life, wherein the death benefit is the greater of: (a) a predetermined guaranteed death benefit amount; and (b) the present contract value. Alternatively, the guaranteed death benefit is paid to the beneficiary only if the relevant life dies during the accumulation phase. Preferably, the value of the annuity payments, if any, equals the value of the most recent lifetime benefit payment.

In another embodiment, the present invention comprises a deferred variable annuity contract comprising: (i) means for calculating a payment base; (ii) means for calculating a contract value; (iii) means for determining a withdrawal percent table; and (iv) means for calculating a lifetime benefit payment; wherein the lifetime benefit payment withdrawal is determined by the following formula:

$$LBP \text{ withdrawal} = (\text{a Withdrawal Percent}) \times (\text{a Withdrawal Base}) \times (\text{an Adjustment Factor}),$$

wherein the withdrawal percent is predetermined according to a withdrawal percent table and wherein the adjustment factor is modified over time. Preferably, the adjustment factor is related to the number of deferred years waited by the relevant life until a first lifetime benefit payment withdrawal is requested.

In another embodiment, the present invention comprises a system for administering a deferred variable annuity contract during the accumulation phase, the improvement comprising: administration means operative to calculate a lifetime benefit payment, wherein the lifetime benefit payment withdrawal is determined by the following formula:

$$LBP \text{ withdrawal} = (\text{a Withdrawal Percent}) \times (\text{a Withdrawal Base}) \times (\text{an Adjustment Factor}),$$

wherein the withdrawal percent is predetermined according to a withdrawal percent table and wherein the adjustment factor is modified over time. Preferably, the adjustment factor is related to the number of deferred years waited by the relevant life until a first lifetime benefit payment withdrawal is requested.

In another embodiment, the annuity product includes a step-up provision wherein the payment base is increased in response to positive performance of the underlying investments of the contract for a given period.

Other formulas may be utilized to determine the yearly lifetime benefit payment amount, wherein the withdrawal base is related to other values besides the payment base and/or the contract value.

The following description and examples further illustrate the preferred features of the present invention.

Each time a lifetime benefit payment withdrawal request is received, the withdrawal percent is provided by utilizing the withdrawal percent table and looking up the corresponding age of the relevant life. The relevant life does not have to wait for the contract anniversary date in order to request the withdrawal percent that corresponds to his attained age as provided by a predetermined withdrawal percent table. The lifetime benefit payment withdrawal amount is then determined by the following formula:

$$LBP \text{ withdrawal} = (\text{the Withdrawal Percent}) \times (\text{a Withdrawal Base}) \times (\text{an Adjustment Factor}),$$

wherein the withdrawal percent is determined by said withdrawal percent table. The withdrawal base may be equal to the original premium, the payment base, the contract value, or the greater of the payment base and the contract value. In the embodiment where the withdrawal base is equal to the greater of the payment base and the contract value, a test will be performed to determine the greater of: (i) (the Payment Base)×(the Withdrawal Percent); and (ii) (the Contract Value)×(the Withdrawal Percent). The "guaranteed lifetime benefit payment" is equal to (the Payment Base)×(the Withdrawal Percent); and the "maximum lifetime benefit payment" is equal to (the Contract Value)×(the Withdrawal Percent).

Preferably, the adjustment factor is related to the number of deferred years waited by the relevant life until a first lifetime benefit payment withdrawal is requested. The formula for determining the adjustment factor is predetermined by the company issuing the annuity. In a preferred embodiment the adjustment factor is determined by the following formula:

$$\text{Inflation Adjustment Factor} = [1+(\text{a predetermined factor}) \times (\text{the number of deferred years waited by the relevant life until a first lifetime benefit payment withdrawal is requested})]^Y,$$ wherein $Y$ is equal to (the number of the lifetime benefit payment withdrawal year, wherein the year of the first lifetime benefit payment withdrawal is set as year number 1).

Preferably, the predetermined factor is in the range of 0%-5.0%. More preferably, the predetermined factor is in the range of 0.05%-2.0%. Most preferably, the predetermined factor is equal to 0.25%.

In a preferred embodiment, (the Withdrawal Percent)×(the adjustment factor) must be equal to or less then a predetermined maximum percent. Preferably, the predetermined maximum percent is in the range of 0% to 25.0%. More preferably, the predetermined maximum percent is in the range of 1.0% to 15.0%. Most preferably, the predetermined maximum percent is equal to 10.0%. The relevant life may request a lifetime benefit payment amount during each period that is up to the LBP withdrawal amount, which in one embodiment is the greater of the "guaranteed lifetime benefit payment" and the "maximum lifetime benefit payment".

The adjustment factor provides the relevant life with an incentive to defer the first withdrawal payment for as long as possible in order to realize greater inflation protection benefits further down the road and to make their future payments more than what they would be if they did not defer the first benefit payment. Further, even after the first withdrawal request is taken, the adjustment factor continues to increase each year thereafter because the adjustment factor formula is exponentially related to the number of the lifetime benefit payment withdrawal year, wherein the year of the first lifetime benefit payment withdrawal is set as year number 1. Further, the greater the number of deferred years until the first benefit payment, then the greater the value that is exponentially increased which is the adjustment factor. The predetermined maximum percent does not permit the lifetime benefit payment to exceed a predetermined percent of the Withdrawal Base.

As described herein, the adjustment factor varies over time and is preferably a function of (i) the number of deferred years waited by the relevant life until a first lifetime benefit payment withdrawal is requested; and (ii) the number of the lifetime benefit payment withdrawal year, wherein the year of the first lifetime benefit payment withdrawal is set as year number 1. In other embodiments, the adjustment factor remains constant over time once it is first established. Other formulas may be utilized for determining the adjustment factor. Alternatively, a predetermined adjustment factor chart may be utilized wherein the respective values of the adjustment factors are selected by the company issuing the annuity and/or the relevant life. Preferably, the adjustment factor is related in some aspect to the number of deferred years waited by the relevant life until a first lifetime benefit payment withdrawal is requested.

The following example illustrates one embodiment of the present method and system. The following withdrawal percent table is set for the following example. Such predetermined values for the percents and the attained age ranges for the withdrawal percent table are strictly for the purposes of illustration. For example, the predetermined withdrawal percentages may be in the range of 0% to 100%, and more preferably in the range of 0% to 50%.

| Withdrawal Percent Table: | |
| --- | --- |
| Attained Age of Relevant Life | Available Withdrawal Percentage |
| 60-64 | 5.0% |
| 65-69 | 5.5% |
| 70-74 | 6.0% |
| 75-79 | 6.5% |
| 80 and above | 7.0% |

LBP withdrawal=(the Withdrawal Percent)×(a Withdrawal Base)×(an Adjustment Factor), wherein the withdrawal percent is determined by said withdrawal percent table.

Adjustment Factor=$[1+(\text{a predetermined factor}) \times (\text{the number of deferred years waited by the relevant life until a first lifetime benefit payment withdrawal is requested})]^Y$, wherein Y is equal to (the number of the lifetime benefit payment withdrawal year, wherein the year of the first lifetime benefit payment withdrawal is set as year number 1).

the predetermined factor=0.25%.

(the Withdrawal Percent)×(the Adjustment Factor) must be equal to or less then 10%.

Note: For purposes of illustration, the relevant life cannot take lifetime benefit payments until reaching age 60.

EXAMPLE 1

Relevant life buys an annuity contract on Mar. 31, 1983 at age 60 and 8 months;

Relevant life starts taking lifetime benefit payments on Apr. 31, 1983 at age 60 and 9 months, therefore the Withdrawal Percent is locked in at 5.0%;

The number of deferred years waited by the relevant life until a first lifetime benefit payment withdrawal is requested=0.

the Adjustment Factor=$[1+(0.25\%) \times (0)]^Y = [1+0]^Y = [1]^Y$

For the purposes of illustration, the withdrawal base is equal to the payment base. Additionally, for the purposes of illustration, the relevant life is 60 years old on Mar. 31, 1983 and his birthday is on Mar. 31, 1983. That is, his birthday and the contract anniversary date are the same.

The available lifetime benefit payments are as follows:

| Age of relevant life | Period Started | Premium Payment | Payment Base | Withdrawal Percent | Y | Adjustment Factor | Requested lifetime benefit payment |
| --- | --- | --- | --- | --- | --- | --- | --- |
| 60 | Mar. 31, 1983 | 100,000 | 100,000 | 5.0% | 1 | 1 | 5,000 |
| 61 | Mar. 31, 1984 | — | 100,000 | 5.0% | 2 | 1 | 5,000 |
| 62 | Mar. 31, 1985 | — | 100,000 | 5.0% | 3 | 1 | 5,000 |
| 63 | Mar. 31, 1986 | — | 100,000 | 5.0% | 4 | 1 | 5,000 |
| 64 | Mar. 31, 1987 | — | 100,000 | 5.0% | 5 | 1 | 5,000 |
| 65 | Mar. 31, 1988 | — | 100,000 | 5.0% | 6 | 1 | 5,000 |
| 66 | Mar. 31, 1989 | — | 100,000 | 5.0% | 7 | 1 | 6,000 |
| 67 | Mar. 31, 1990 | — | 100,000 | 5.0% | 8 | 1 | 7,000 |
| 68 | Mar. 31, 1991 | — | 100,000 | 5.0% | 9 | 1 | 8,000 |

EXAMPLE 2

Relevant life buys an annuity contract on Mar. 31, 1983 at age 60 and 8 months;

Relevant life starts taking lifetime benefit payments on Apr. 31, 1984 at age 61 and 9 months, therefore the withdrawal percent is locked in at 5.0%;

The number of deferred years waited by the relevant life until a first lifetime benefit payment withdrawal is requested=1.

The Adjustment Factor=$[1+(0.25\%)\times(1)]^Y=[1+0.25\%]^Y=[1.0025]^Y$

For the purposes of illustration, the withdrawal base is equal to the payment base. Additionally, for the purposes of illustration, the relevant life is 60 years old on Mar. 31, 1983 and his birthday is on Mar. 31, 1983. That is, his birthday and the contract anniversary date are the same.

The available lifetime benefit payments are as follows:

| Age of relevant life | Period Started | Premium Payment | Payment Base | Withdrawal Percent | Y | Adjustment Factor | Requested lifetime benefit payment |
|---|---|---|---|---|---|---|---|
| 60 | Mar. 31, 1983 | 100,000 | 100,000 | N/A | N/A | N/A | 0 |
| 61 | Mar. 31, 1984 | — | 100,000 | 5.0% | 1 | $(1.0025)^1$ | 5012.50 |
| 62 | Mar. 31, 1985 | — | 100,000 | 5.0% | 2 | $(1.0025)^2$ | 5025.03 |
| 63 | Mar. 31, 1986 | — | 100,000 | 5.0% | 3 | $(1.0025)^3$ | 5037.59 |
| 64 | Mar. 31, 1987 | — | 100,000 | 5.0% | 4 | $(1.0025)^4$ | 5050.19 |
| 65 | Mar. 31, 1988 | — | 100,000 | 5.0% | 5 | $(1.0025)^5$ | 5062.81 |
| 66 | Mar. 31, 1989 | — | 100,000 | 5.0% | 6 | $(1.0025)^6$ | 5075.47 |
| 67 | Mar. 31, 1990 | — | 100,000 | 5.0% | 7 | $(1.0025)^7$ | 5088.16 |
| 68 | Mar. 31, 1991 | — | 100,000 | 5.0% | 8 | $(1.0025)^8$ | 5100.88 |

EXAMPLE 3

Relevant life buys an annuity contract on Mar. 31, 1983 at age 60 and 8 months;

Relevant life starts taking lifetime benefit payments on Apr. 31, 1987 at age 64 and 9 months, therefore the withdrawal percent is locked in at 5.0%;

The number of deferred years waited by the relevant life until a first lifetime benefit payment withdrawal is requested=4.

The Adjustment Factor=$[1+(0.25\%)\times(4)]^Y=[1+1.00\%]^Y=[1.01]^Y$

For the purposes of illustration, the withdrawal base is equal to the payment base. Additionally, for the purposes of illustration, the relevant life is 60 years old on Mar. 31, 1983 and his birthday is on Mar. 31, 1983. That is, his birthday and the contract anniversary date are the same.

The available lifetime benefit payments are as follows:

| Age of relevant life | Period Started | Premium Payment | Payment Base | Withdrawal Percent | Y | Adjustment Factor | Requested lifetime benefit payment |
|---|---|---|---|---|---|---|---|
| 60 | Mar. 31, 1983 | 100,000 | 100,000 | N/A | N/A | N/A | 0 |
| 61 | Mar. 31, 1984 | — | 100,000 | N/A | N/A | N/A | 0 |
| 62 | Mar. 31, 1985 | — | 100,000 | N/A | N/A | N/A | 0 |
| 63 | Mar. 31, 1986 | — | 100,000 | N/A | N/A | N/A | 0 |
| 64 | Mar. 31, 1987 | — | 100,000 | 5.0% | 1 | $(1.01)^1$ | 5050.00 |
| 65 | Mar. 31, 1988 | — | 100,000 | 5.0% | 2 | $(1.01)^2$ | 5100.50 |
| 66 | Mar. 31, 1989 | — | 100,000 | 5.0% | 3 | $(1.01)^3$ | 5151.51 |
| 67 | Mar. 31, 1990 | — | 100,000 | 5.0% | 4 | $(1.01)^4$ | 5203.02 |
| 68 | Mar. 31, 1991 | — | 100,000 | 5.0% | 5 | $(1.01)^5$ | 5255.05 |

EXAMPLE 4

Relevant life buys an annuity contract on Mar. 31, 1983 at age 60 and 8 months;
Relevant life starts taking lifetime benefit payments on Apr. 31, 2003 at age 80 and 9 months, therefore the withdrawal percent is locked in at 7.0%;
The number of deferred years waited by the relevant life until a first lifetime benefit payment withdrawal is requested=20.
The Adjustment Factor=$[1+(0.25\%)\times(20)]^Y=[1+5.00\%]^Y=[1.05]^Y$ For the purposes of illustration, the withdrawal base is equal to the payment base. Additionally, for the purposes of illustration, the relevant life is 60 years old on Mar. 31, 1983 and his birthday is on Mar. 31, 1983. That is, his birthday and the contract anniversary date are the same.

The available lifetime benefit payments are as follows:

| Age of relevant life | Period Started | Premium Payment | Payment Base | Withdrawal Percent | Y | Adjustment Factor | Requested lifetime benefit payment |
|---|---|---|---|---|---|---|---|
| 60 | Mar. 31, 1983 | 100,000 | 100,000 | N/A | N/A | N/A | 0 |
| 61 | Mar. 31, 1984 | — | 100,000 | N/A | N/A | N/A | 0 |
| 62 | Mar. 31, 1985 | — | 100,000 | N/A | N/A | N/A | 0 |
| 63 | Mar. 31, 1986 | — | 100,000 | N/A | N/A | N/A | 0 |
| 64 | Mar. 31, 1987 | — | 100,000 | N/A | N/A | N/A | 0 |
| 65 | Mar. 31, 1988 | — | 100,000 | N/A | N/A | N/A | 0 |
| 66 | Mar. 31, 1989 | — | 100,000 | N/A | N/A | N/A | 0 |
| 67 | Mar. 31, 1990 | — | 100,000 | N/A | N/A | N/A | 0 |
| 68 | Mar. 31, 1991 | — | 100,000 | N/A | N/A | N/A | 0 |
| 69 | Mar. 31, 1992 | — | 100,000 | N/A | N/A | N/A | 0 |
| 70 | Mar. 31, 1993 | — | 100,000 | N/A | N/A | N/A | 0 |
| 71 | Mar. 31, 1994 | — | 100,000 | N/A | N/A | N/A | 0 |
| 72 | Mar. 31, 1995 | — | 100,000 | N/A | N/A | N/A | 0 |
| 73 | Mar. 31, 1996 | — | 100,000 | N/A | N/A | N/A | 0 |
| 74 | Mar. 31, 1997 | — | 100,000 | N/A | N/A | N/A | 0 |
| 75 | Mar. 31, 1998 | — | 100,000 | N/A | N/A | N/A | 0 |
| 76 | Mar. 31, 1999 | — | 100,000 | N/A | N/A | N/A | 0 |
| 77 | Mar. 31, 2000 | — | 100,000 | N/A | N/A | N/A | 0 |
| 78 | Mar. 31, 2001 | — | 100,000 | N/A | N/A | N/A | 0 |
| 79 | Mar. 31, 2002 | — | 100,000 | N/A | N/A | N/A | 0 |
| 80 | Mar. 31, 2003 | — | 100,000 | 7.0% | 1 | $(1.05)^1$ | 7350.00 |
| 81 | Mar. 31, 2004 | — | 100,000 | 7.0% | 2 | $(1.05)^2$ | 7717.50 |
| 82 | Mar. 31, 2005 | — | 100,000 | 7.0% | 3 | $(1.05)^3$ | 8103.38 |
| 83 | Mar. 31, 2006 | — | 100,000 | 7.0% | 4 | $(1.05)^4$ | 8508.54 |
| 84 | Mar. 31, 2007 | — | 100,000 | 7.0% | 5 | $(1.05)^5$ | 8933.97 |
| 85 | Mar. 31, 2008 | — | 100,000 | 7.0% | 6 | $(1.05)^6$ | 9380.67 |
| 86 | Mar. 31, 2009 | — | 100,000 | 7.0% | 7 | $(1.05)^7$ | 9849.70 |
| 87 | Mar. 31, 2010 | — | 100,000 | 7.0% | 8 | $(1.05)^8$ | 10,000.00 |
| 88 | Mar. 31, 2011 | — | 100,000 | 7.0% | 9 | $(1.05)^9$ | 10,000.00 |

In the above example, (the Withdrawal Percent)×(the Adjustment Factor) exceeded 10% for the last two payment years, therefore the lifetime benefit payment was set at $10,000.00 for the last two years provided in the example.

Having thus described the invention in rather full detail, it will be understood that such detail need not be strictly adhered to, but that additional changes and modifications may suggest themselves to one skilled in the art, all falling within the scope of the invention as defined by the subjoined claims.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A data processing system for administering a deferred variable annuity contract during the accumulation phase, the annuity contract including a payment base, a contract value, and lifetime benefit payments for a relevant life, said system comprising:
a storage device including data relating to:
the payment base,
the contract value,
a withdrawal percent relationship,
a withdrawal percent,
the lifetime benefit payments, and
the annuity contract; and
a processor operatively coupled to the storage device to read said data,
the storage device storing modules utilized by the processor for: calculating
the payment base,
calculating the contract value,
calculating the withdrawal percent relationship, and
calculating a lifetime benefit payment; and
wherein a maximum available lifetime benefit payment is calculated using the following formula:

((withdrawal percent)×(withdrawal base)×(adjustment factor));

wherein the adjustment factor is at least 1 and is determinable at a time of a lifetime benefit payment withdrawal request based on (1) a period of deferral from a time the lifetime benefit payment withdrawal was first available until a first lifetime benefit payment withdrawal request; and (2) a period of time since the first lifetime benefit payment withdrawal request;

wherein withdrawals do not decrease the payment base when the withdrawals during a year are not more than the maximum available lifetime benefit payment.

2. The data processing system of claim 1, wherein the adjustment factor is calculated using the following formula:

$$([1 + (\text{predetermined factor}) \times (\text{number of deferred years until a first lifetime benefit payment withdrawal is requested})]^Y);$$

wherein Y is equal to (the number of the lifetime benefit payment withdrawal year, wherein the year of the first lifetime benefit payment withdrawal is set as year number 1).

3. The data processing system of claim 1, wherein the withdrawal percent is predetermined according to said withdrawal percent relationship and wherein the adjustment factor is modified over time.

4. A system for administering a deferred variable annuity contract during the accumulation phase, the annuity contract including a payment base value, a contract value, and lifetime benefit payments for a relevant life, comprising:
 a storage device including data relating to:
  the deferred variable annuity contract,
  the lifetime benefit payments,
  the payment base value, and
  the contract value; and
 a processor operatively coupled to the storage device to read said data,
 the storage device storing modules utilized by the processor, the modules comprising:
  i. a first module for receiving information in order to establish the deferred variable annuity contract;
  ii. a second module for receiving lifetime benefit payment withdrawal requests;
  iii. a third module for calculating a maximum available lifetime benefit payment; wherein the maximum available lifetime benefit payment is calculated according to the following formula:

$$((\text{withdrawal percent}) \times (\text{withdrawal base}) \times (\text{adjustment factor}));$$

wherein the withdrawal percent is predetermined according to a withdrawal percent relationship and
wherein the third module is further for determining the adjustment factor at a time of a lifetime benefit payment request based on (1) a period of deferral from a time the lifetime benefit payment withdrawal was first available until a first lifetime benefit payment withdrawal request; and (2) a period of time since the first lifetime benefit payment withdrawal request; and
wherein withdrawals paid to the relevant life do not decrease the payment base when the withdrawals during a year are not more than the maximum available lifetime benefit payment.

5. A system for administering a deferred variable annuity contract during the accumulation phase, the annuity contract including a payment base value, a contract value, and lifetime benefit payments for a relevant life, comprising:
 a storage device including data relating to:
  the deferred variable annuity contract,
  the lifetime benefit payments,
  the payment base value, and
  the contract value; and
 a processor operatively coupled to the storage device to read said data,
 the storage device storing modules utilized by the processor, the modules comprising:
  a. a first module for calculating the payment base;
  b. a second module for calculating the contract value;
  c. a third module for calculating a withdrawal percent relationship;
  d. a fourth module for calculating a maximum available lifetime benefit payment wherein the maximum available lifetime benefit payment is calculated using the following formula:

$$((\text{withdrawal percent}) \times (\text{withdrawal base}) \times (\text{adjustment factor})); \text{ and}$$

wherein the withdrawal percent is predetermined according to a withdrawal percent relationship and wherein the fourth module is further for calculating the adjustment factor based on (1) a period of deferral from a time the lifetime benefit payment withdrawal was first available until a first lifetime benefit payment withdrawal request; and (2) a period of time since the first lifetime benefit payment withdrawal request; and
wherein withdrawals paid to the relevant life do not decrease the payment base when the withdrawals during a year are not more than the maximum available lifetime benefit payment.

6. A system for administering a deferred variable annuity contract during the accumulation phase, the annuity contract including a payment base value, a contract value, and lifetime benefit payments for a relevant life, comprising:
 a storage device including data relating to:
  the deferred variable annuity contract,
  the lifetime benefit payments,
  the payment base value, and
  the contract value; and
 a processor operatively coupled to the storage device to read said data,
 the storage device storing a module utilized by the processor, comprising: an administration module operative to calculate a maximum available lifetime benefit payment, wherein the maximum available lifetime benefit payment is calculated using:

$$((\text{withdrawal percent}) \times (\text{withdrawal base}) \times (\text{adjustment factor})); \text{ and}$$

wherein the withdrawal percent is predetermined according to a withdrawal percent relationship and
wherein the adjustment factor is at least 1 and has a value based on (1) a period of deferral from a time the lifetime benefit payment withdrawal was first available until a first lifetime benefit payment withdrawal request; and (2) a period of time since the first lifetime benefit payment withdrawal request; and
wherein withdrawals paid to the relevant life do not decrease the payment base when the withdrawals during a year are not more than the maximum available lifetime benefit payment.

7. A computer implemented data processing method for administering a deferred variable annuity product during the accumulation phase, the annuity product including a payment base, a contract value, and lifetime benefit payments for a relevant life, said method comprising the steps of:
 a. calculating by a processor the payment base for said annuity contract;

b. calculating by the processor the contract value for said annuity contract;
c. calculating by the processor a withdrawal percent relationship;
d. if requested, periodically calculating by the processor a lifetime benefit payment withdrawal for the relevant life from the contract which decreases the contract value;

wherein a maximum available lifetime benefit payment is calculated by the following formula:

$$((\text{withdrawal percent}) \times (\text{withdrawal base}) \times (\text{adjustment factor})); \text{ and}$$

wherein the withdrawal percent is calculated using said withdrawal percent relationship and wherein the adjustment factor is at least 1 and has a value based on (1) a period of deferral from a time the lifetime benefit payment withdrawal was first available until a first lifetime benefit payment withdrawal request; and (2) a period of time since the first lifetime benefit payment withdrawal request;

wherein withdrawals paid to the relevant life do not decrease the payment base when withdrawals during a year are not more than the maximum available lifetime benefit payment.

8. The computer implemented data processing method of claim 7, wherein said withdrawal base equals the amount of the original premium.

9. The computer implemented data processing method of claim 7, wherein said withdrawal base equals the payment base.

10. The computer implemented data processing method of claim 7, wherein said withdrawal base equals the contract value.

11. The computer implemented data processing method of claim 7, wherein said withdrawal base equals the greater of the payment base or the contract value.

12. The computer implemented data processing method of claim 7, wherein the adjustment factor is calculated using the following formula:

$$([1+(\text{predetermined factor}) \times (\text{number of deferred years until a first lifetime benefit payment withdrawal is requested})]^Y); \text{ and}$$

wherein Y is equal to (the number of the lifetime benefit payment withdrawal year, wherein the year of the first lifetime benefit payment withdrawal is set as year number 1).

13. The computer implemented data processing method of claim 12, wherein the predetermined factor is in the range of 0% to 1%.

14. The computer implemented data processing method of claim 7, wherein the withdrawal percent relationship is based on the age of the relevant life.

15. The computer implemented data processing method of claim 14, wherein the withdrawal percent relationship has a maximum withdrawal percent within the range of 0% to 10% for any given attained age.

16. The computer implemented data processing method of claim 14, wherein the withdrawal percent relationship has a maximum withdrawal percent within the range of 0% to 15% for any given attained age.

17. The computer implemented data processing method of claim 7, wherein a predetermined maximum percent is greater than or equal to ((withdrawal percent)×(adjustment factor)).

18. The computer implemented data processing method of claim 17, wherein the predetermined maximum percent is in the range of 0% to 15%.

19. The computer implemented data processing method of claim 7, wherein the withdrawal percent relationship increases the available withdrawal percent 0.5% for every 4 year increase in the attained age of the relevant life.

20. The computer implemented data processing method of claim 18, wherein the maximum available lifetime benefit payment amount for a period is greater than the lifetime benefit payment withdrawal that is requested by the relevant life.

21. The computer implemented data processing method of claim 7, further comprising the step of calculating a death benefit for a beneficiary upon the death of the relevant life, wherein the death benefit is the greater of (a) a predetermined guaranteed death benefit amount; or (b) the present contract value.

22. The computer implemented data processing method of claim 21, wherein the guaranteed death benefit is paid to the beneficiary only if the relevant life dies during the accumulation phase.

23. The computer implemented data processing method of claim 7, wherein a value of annuity payments made during the annuitization phase of the product equals the value of the most recent lifetime benefit payment.

* * * * *